2708B2" />

(12) United States Patent
Mukaibara

(10) Patent No.: US 9,182,708 B2
(45) Date of Patent: Nov. 10, 2015

(54) HIGH-VOLTAGE GENERATION APPARATUS

(75) Inventor: Takuya Mukaibara, Susono (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 240 days.

(21) Appl. No.: 13/189,139

(22) Filed: Jul. 22, 2011

(65) Prior Publication Data

US 2012/0027448 A1   Feb. 2, 2012

(30) Foreign Application Priority Data

Jul. 30, 2010 (JP) ................................. 2010-172929

(51) Int. Cl.
*G03G 15/00* (2006.01)
*H02M 3/335* (2006.01)
*G03G 15/16* (2006.01)
*H02M 1/36* (2007.01)

(52) U.S. Cl.
CPC ........ *G03G 15/1645* (2013.01); *G03G 15/1675* (2013.01); *H02M 1/36* (2013.01)

(58) Field of Classification Search
USPC ................ 399/37, 88, 89; 307/75; 363/21.01, 363/21.04, 21.09, 1, 11, 19, 20
See application file for complete search history.

(56) References Cited

U.S. PATENT DOCUMENTS

| | | | | |
|---|---|---|---|---|
| 5,999,760 A | * | 12/1999 | Suzuki et al. ................... | 399/45 |
| 7,376,366 B2 | * | 5/2008 | Deguchi .......................... | 399/66 |
| 7,602,164 B2 | * | 10/2009 | Vo .................................. | 323/282 |
| 2004/0000897 A1 | | 1/2004 | Asayama | |
| 2004/0189264 A1 | * | 9/2004 | Matsuura et al. ............. | 323/224 |
| 2007/0236192 A1 | | 10/2007 | Vo | |
| 2009/0273324 A1 | | 11/2009 | Okamoto | |
| 2010/0329715 A1 | * | 12/2010 | Tsukamura et al. ............ | 399/66 |

FOREIGN PATENT DOCUMENTS

| | | | | |
|---|---|---|---|---|
| CN | 1953309 A | | 4/2007 | |
| JP | 9-093920 A | | 4/1997 | |
| JP | 2001-231289 A | | 8/2001 | |
| JP | 2001-296720 A | | 10/2001 | |
| JP | 2004-037635 A | | 2/2004 | |
| JP | 2004088965 A | * | 3/2004 | .............. H02M 3/00 |
| JP | 2008-058510 A | | 3/2008 | |

OTHER PUBLICATIONS

JP_0909392__A__T Machine Translation.*
Machine Translation JP_09093920__A__T, Published Apr. 1997, Title-DC High Voltage power supply, Inventor—Sakai Kazuo.*
U.S. Appl. No. 13/189,073, filed Jul. 22, 2011, Takuya Mukaibara.

* cited by examiner

*Primary Examiner* — Clayton E Laballe
*Assistant Examiner* — Victor Verbitsky
(74) *Attorney, Agent, or Firm* — CANON USA, INC., IP Division

(57) ABSTRACT

A high-voltage generation apparatus raises, when switching from a state where a voltage having a predetermined polarity is output to a state where a voltage having a polarity opposite to the predetermined polarity is output, the voltage having the predetermined polarity in change amounts corresponding to the voltage having the predetermined polarity and a target voltage having the opposite polarity in a transient-state period elapsed until the voltage reaches the target voltage.

8 Claims, 22 Drawing Sheets

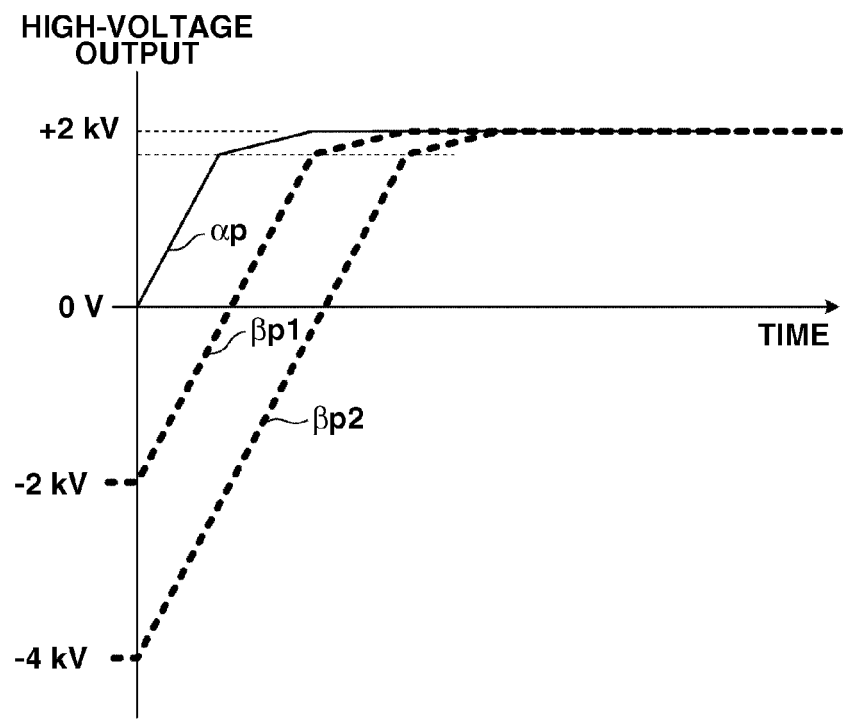
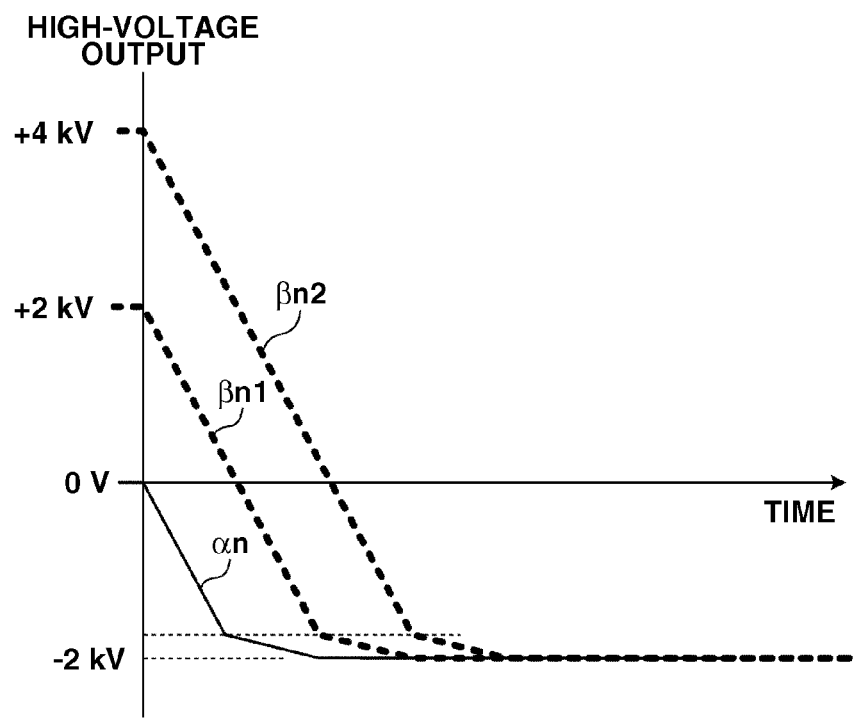

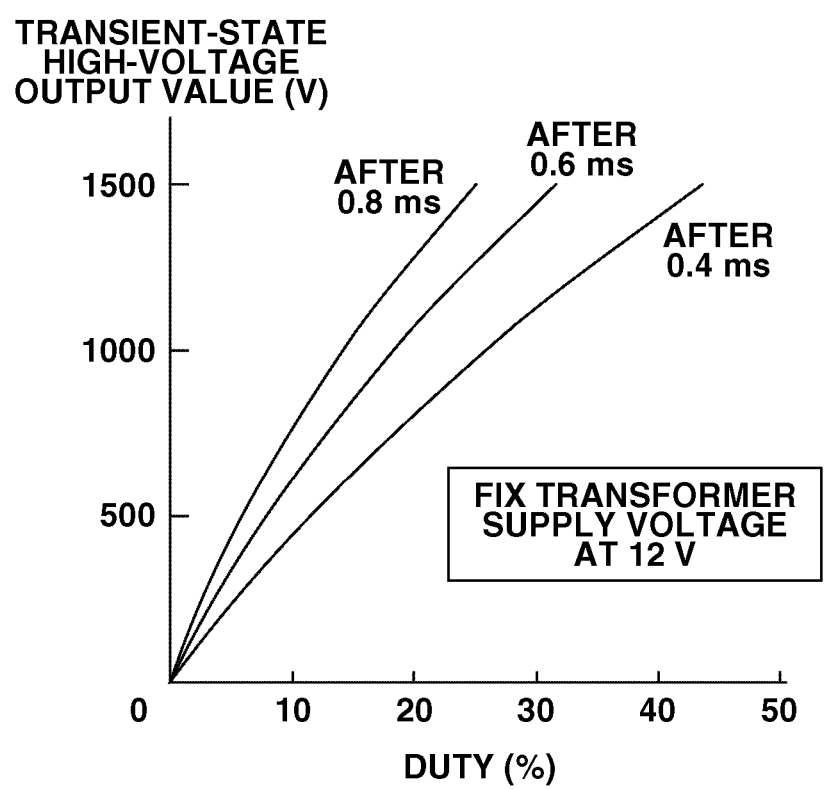

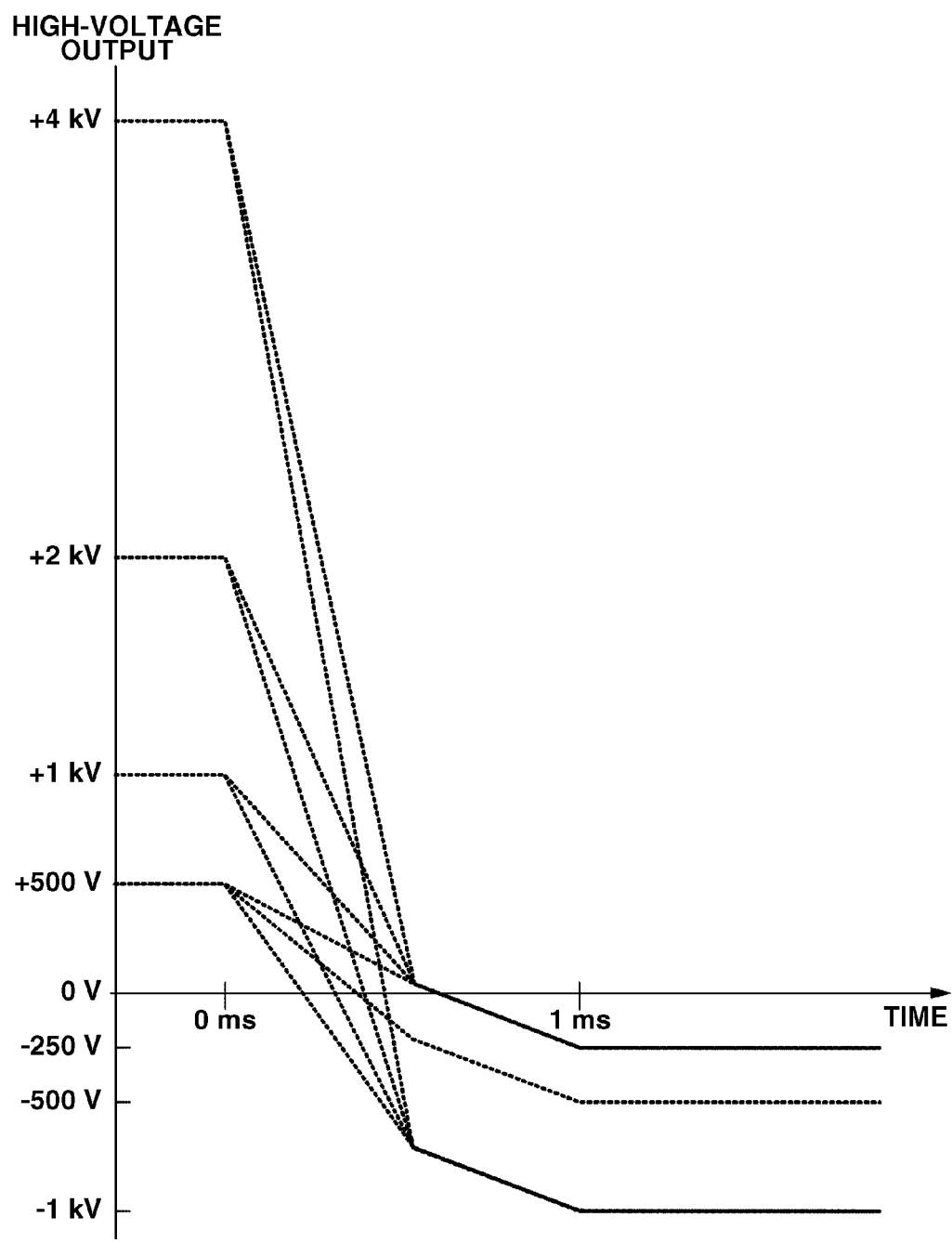

HIGH-VOLTAGE GENERATION APPARATUS

BACKGROUND OF THE INVENTION

1. Field of the Invention

The present invention relates to a high-voltage generation apparatus, and more particularly, to a high-voltage generation apparatus capable of raising the high voltage to a target voltage at high speed.

2. Description of the Related Art

In recent years, in an electrophotographic color image forming apparatus, a configuration including a photosensitive drum serving as an image bearing member for forming an image to increase a print speed for each color (also referred to as a tandem type color image forming apparatus) has been mainstream. In the tandem type color image forming apparatus, a color misregistration detection pattern image and a density detection pattern image are formed on an intermediate transfer belt, for example, and an optical sensor detects light reflected from a patch image, to perform color misregistration correction and density correction (the corrections are also referred to as calibrations) based on a detection result. The calibrations are mainly executed at timing, for example, at the time of replacement of a cartridge including a photosensitive drum, at the time of power application, and after a lapse of a predetermined time. The color misregistration detection pattern image and the density detection pattern image are together merely referred to as a patch image.

In the color image forming apparatus, when image formation is continuously performed (hereinafter also referred to as "continuous printing is performed") on a plurality of recording materials, a temperature in the apparatus rises. This rise in temperature causes the recording materials to be deformed or distorted due to effects of rises in temperature of a scanning optical unit for forming a latent image on a photosensitive drum and components in the unit so that a color misregistration amount of the image may be increased. A rise in temperature of the photosensitive drum by continuous image formation causes an image formation condition to change so that a density of the image may vary. In order to reduce a color misregistration and a density variation due to the rises in temperature, the calibrations may be executed when the rise in temperature is monitored to enter a predetermined condition even in the continuous image formation. However, an image forming operation is temporarily interrupted due to the calibrations during the continuous printing, resulting in significantly reduced productivity.

A technique for sequentially executing calibrations to correct a color misregistration and a density while performing continuous printing without reducing productivity during the continuous printing has been proposed. For example, there is a method for forming and detecting a patch image a plurality of times for each color in a non-image formation area between a trailing edge of an image and a leading edge of the subsequent image (also referred to as between images or between sheets). Thus, density control can be performed without temporarily interrupting image formation. The patch image formed in the non-image formation area between sheets is recovered by a similar cleaning mechanism to that during recovery of toner remaining on a transfer belt, e.g., a cleaning blade that abuts on the transfer belt. An apparatus using an electrostatic transfer belt as the transfer belt can clean the patch image without any difficulty. However, in an intermediate transfer belt type apparatus, a nip portion between a secondary transfer roller and an intermediate transfer belt is arranged upstream in a toner image conveyance direction of the cleaning blade. More specifically, the patch image adheres to the secondary transfer roller, and adheres to the back of a recording material that then passes through the nip portion so that the back of the recording material may be smudged. In the intermediate transfer belt type apparatus, a method for instantaneously switching a secondary transfer bias to a negative bias according to timing at which the non-image formation area passes through the nip portion to prevent the back of the recording material from being smudged is required. A circuit for outputting the secondary transfer bias is a circuit giving priority to stability during steady output. Times required to raise and lower a high voltage are approximately 50 ms to 100 ms.

In order to increase the speed of the color image forming apparatus, to form a patch image between sheets without reducing productivity, an electrical technique for applying a bias having a polarity opposite to that of a bias in an image formation area in a short time is required. More specifically, the above-mentioned times required for rise and fall are required to be further shortened. Japanese Patent Application Laid-Open No. 2008-58510 discusses a technique for shortening a time required for fall in a configuration in which high-voltage power sources having a positive polarity and a negative polarity are provided, and are respectively turned off and turned on according to timing at which a patch image passes through a transfer nip portion. In Japanese Patent Application Laid-Open No. 2008-58510, a capacitor for rectifying and smoothing an alternating-current (AC) voltage output from a transformer for a positive bias and an electric charge charged in a capacitance of a load unit are drawn into a power source for a negative bias so that a voltage level is rapidly reduced. As a result, a time required to fall for switching an output of a high-voltage bias from a positive polarity to a negative polarity is shortened to approximately 10 ms to 20 ms (see FIG. 4 in Japanese Patent Application laid-Open No. 2008-58510). Even if a time between sheets becomes short, therefore, an output of a transfer bias can be switched to a negative polarity within a time elapsed since a trailing edge of a recording material passes through the transfer nip portion until the recording material reaches a leading edge of the patch image.

As an example in which a high voltage is raised at high speed, Japanese Patent Application Laid-Open No. 9-93920 discusses a technique for comparing a detected voltage of a voltage detection circuit with a second reference voltage slightly lower than a reference voltage, to slowly control a rate of charging a capacitor serving as a load when the detected voltage of the voltage detection circuit exceeds the second reference voltage. In Japanese Patent Application Laid-Open No. 9-93920, a fast charging area, a slow charging area, and a maintenance charging area are provided in this order from the time of startup. After the start of the startup, a pulse width modulation (PWM) signal is rapidly raised by increasing its value (a time width of a high-level pulse out of high-level and low-level pulses of the PWM signal; hereinafter referred to as an on-duty width) so that an ON time of the PWM signal becomes the maximum time width. When an output voltage, which reaches the second reference voltage (exemplified as approximately 90%), is detected, switching from the fast charging area to the slow charging area is performed. An integration circuit is provided on the input side of a circuit for generating a pulse of the PWM signal. The capacitor is rapidly charged in an early stage of the time of the startup, and is then slightly charged and discharged in the slow charging area and the maintenance charging area, to reduce an overshoot or an undershoot.

Even if a time required to lower a high voltage is shortened to approximately 10 ms to 20 ms when the high voltage is switched from a positive polarity to a negative polarity, as discussed in Japanese Patent Application Laid-Open No. 2008-58510, when an image formation speed is further increased so that a time between sheets is further shortened, a time required to form a patch image becomes difficult to ensure. FIGS. 1A to 1C illustrate a relationship among the time between sheets, a time required to switch the high voltage, and an operation for forming the patch image. A time during which the patch image can be formed in a non-image formation area between sheets is a time obtained by subtracting [a time required to raise a secondary transfer bias plus a time required to lower the secondary transfer bias] from a non-image formation time. When the time between sheets is further shortened, a ratio of the times required to raise and lower the secondary transfer bias to the non-image formation time is increased. Therefore, there is almost no time required to form the patch image, as illustrated in FIG. 1A. In order to ensure a time required to form the patch image, the time between sheets may be lengthened, as illustrated in FIG. 1B. However, a time required to detect both a color misregistration amount and a density between sheets, i.e., [a time required to form the patch image plus a time required to lower the high voltage plus a time required to raise the high voltage] is ensured so that a time between sheets is significantly lengthened, resulting in reduced productivity. When the time between sheets is further shortened, therefore, a startup capability of the high-voltage generation apparatus (hereinafter described as a capability representing the magnitude of a voltage for raising a potential at a load output unit per unit time) is further required to be rapidly improved to switch a polarity of a high-voltage output unit at high speed, as illustrated in FIG. 1C.

An issue occurring in the high-voltage generation apparatus discussed in Japanese Patent Application Laid-Open No. 9-93920 as another example will be described below with reference to FIGS. 2A and 2B. A waveform αp illustrated in FIG. 2A is an example of a waveform of a positive-polarity bias raised toward a target voltage of +2 kV, for example, using the high-voltage generation apparatus discussed in Japanese Patent Application Laid-Open No. 9-93920. On the other hand, waveforms βp1 and βp2 are examples of a waveform generated when a load unit is charged with a negative potential having an opposite polarity before the high-voltage generation apparatus is started up. A time required for the startup is lengthened by an amount corresponding to a time required to discharge an electric charge charged at the negative potential. More specifically, a time required to switch a polarity of a bias at the time of transition from a non-image formation area to an image formation area, described with reference to FIGS. 1A to 1C, is lengthened. FIG. 2B illustrates a case where a high-voltage generation circuit having a negative polarity is used. A waveform αn is an example of a waveform of a negative-polarity bias raised toward a target voltage of −2 kV. On the other hand, waveforms βn1 and βn2 are examples of a waveform generated when a load unit is charged with a positive potential having an opposite polarity before the high-voltage generation apparatus is started up. A time required for the startup (a time elapsed until a potential is lowered so that its polarity is changed to a negative polarity) is lengthened by an amount corresponding to a time required to discharge an electric charge charged at the positive potential.

SUMMARY OF THE INVENTION

According to an aspect of the present invention, a high-voltage generation apparatus that outputs a direct-current voltage having a predetermined polarity or a polarity opposite to the predetermined polarity includes a transformer, a driving unit configured to drive the transformer, a generation unit configured to generate a driving signal to the driving unit, a rectification unit configured to rectify an output voltage from the transformer to output a direct-current voltage, a detection unit configured to detect the direct-current voltage, a setting unit configured to set a target voltage of the direct-current voltage, a feedback control unit configured to control the driving signal according to the detected direct-current voltage and the set target voltage, and an output control unit configured to control, when switching from a state where the direct-current voltage having the predetermined polarity is output to a state where the direct-current voltage having the opposite polarity is output, to raise the direct-current voltage in change amounts corresponding to the direct-current voltage having the predetermined polarity and the target voltage having the opposite polarity without controlling the driving signal in a transient-state period elapsed until the direct-current voltage reaches the target voltage.

According to another aspect of the present invention, an image forming apparatus includes an image forming unit configured to form an image on a recording material, and a high-voltage power source configured to output a direct-current voltage having a predetermined polarity or a polarity opposite to the predetermined polarity to the image forming unit, in which the high-voltage power source includes a transformer, a driving unit configured to drive the transformer, a generation unit configured to generate a driving signal to the driving unit, a rectification unit configured to rectify an output voltage from the transformer to output a direct-current voltage, a detection unit configured to detect the direct-current voltage, a setting unit configured to set a target voltage of the direct-current voltage, a feedback control unit configured to control the driving signal according to the detected direct-current voltage and the set target voltage, and a control unit configured to control, when switching from a state where the direct-current voltage having the predetermined polarity is output to a state where the direct-current voltage having the opposite polarity is output, to raise the direct-current voltage in change amounts corresponding to the direct-current voltage having the predetermined polarity and the target voltage having the opposite polarity without controlling the driving signal in a transient-state period elapsed until the direct-current voltage reaches the target voltage.

According to yet another aspect of the present invention, a high-voltage generation apparatus that outputs a voltage having a predetermined polarity or a polarity opposite to the predetermined polarity includes an output unit configured to output a voltage, a detection unit configured to detect the output voltage, a setting unit configured to set a target voltage of the output voltage, a feedback control unit configured to control an operation of the voltage output unit according to the detected voltage and the target voltage, and a control unit configured to control, when switching from a state where the voltage having the predetermined polarity is output to a state where the voltage having the opposite polarity is output, to raise the voltage in change amounts corresponding to the voltage having the predetermined polarity and the target voltage having the opposite polarity without controlling the operation in a transient-state period elapsed until the voltage reaches the target voltage.

According to yet another aspect of the present invention, an image forming apparatus includes an image forming unit configured to form an image on a recording material, and a high-voltage power source configured to output a voltage having a predetermined polarity or a polarity opposite to the predetermined polarity to the image forming unit, in which the high-voltage power source includes an output unit configured to output a voltage, a detection unit configured to detect the voltage output from the output unit, a setting unit configured to set a target voltage of the voltage output from the voltage output unit, a feedback control unit configured to control an operation of the voltage output unit according to the detected voltage and the target voltage, and a control unit configured to control, when switching from a state where the voltage having the predetermined polarity is output to a state where the voltage having the opposite polarity is output, to raise the voltage in change amounts corresponding to the voltage having the predetermined polarity and the target voltage having the opposite polarity without controlling the operation in a transient-state period elapsed until the voltage reaches the target voltage.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIGS. 2A and 2B illustrate high-voltage waveforms at the time of startup generated when a load unit is charged with a potential having an opposite polarity.

FIG. 13 illustrates high-voltage waveforms at the time of startup according to the second exemplary embodiment of the present invention for each condition.

FIG. 14 illustrates a relationship between an on-duty width and a high-voltage output (a reach voltage in a steady area without feedback control).

DESCRIPTION OF THE EMBODIMENTS

Various exemplary embodiments, features, and aspects of the invention will be described in detail below with reference to the drawings.

A high-voltage generation apparatus according to an exemplary embodiment of the present invention variably sets a slew rate or a startup period width in consideration of the magnitude of a target voltage having a polarity and the magnitude of a potential having an opposite polarity at a load unit in a transient-state period during which an output voltage is raised before startup of the high-voltage generation apparatus or at least a part of the transient-state period. Further, driving of a boosting transformer in the high-voltage generation apparatus is started under a driving condition in which the output voltage reaches a target voltage at a steep and high slew rate in the transient-state period. The output voltage can converge to the target voltage without any overshoot or undershoot and in a short time regardless of whether the target voltage is high or low. The slew rate in the present exemplary embodiment is a change amount of a voltage generated when the voltage is changed per unit time.

Figure 3:
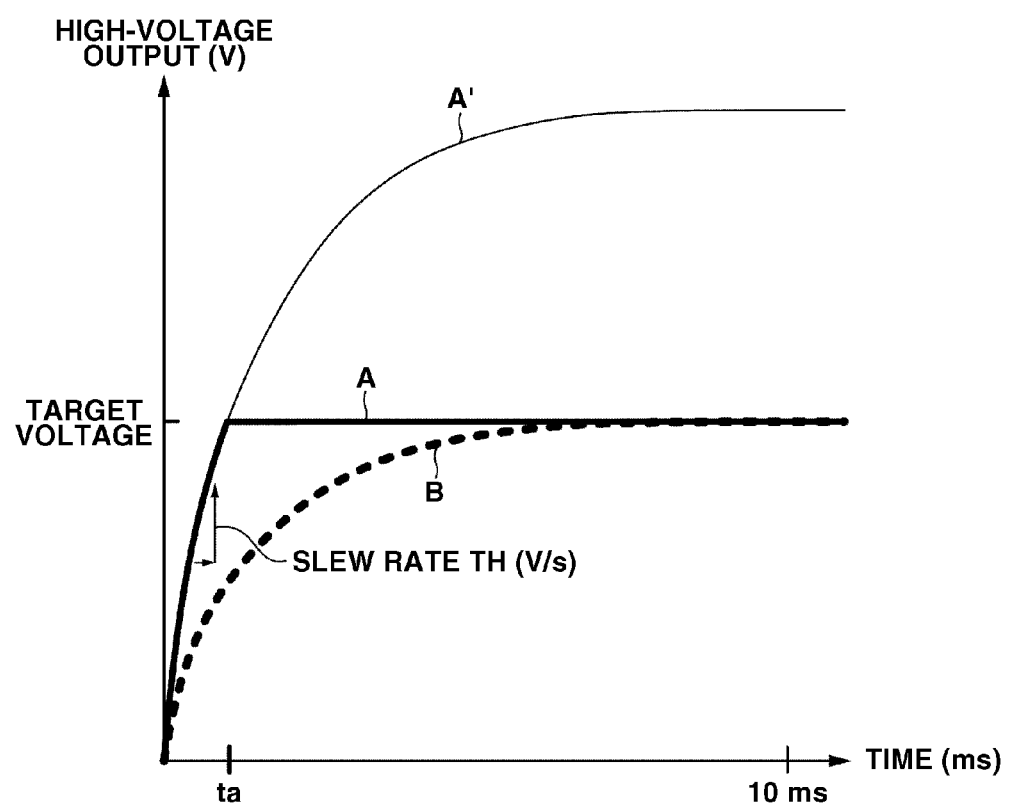
FIG. 3 illustrates high-voltage waveforms generated when an output voltage of a high-voltage generation apparatus reaches a target voltage in a transient state.

FIG. 3 is a schematic view of output waveforms during an operation of a high-voltage generation apparatus in which an output voltage reaches a target voltage at a steep and high slew rate in the present exemplary embodiment. An output waveform B illustrated in FIG. 3 is generated when an output voltage in the high-voltage generation apparatus is raised toward a target voltage according to a curve of a predetermined time constant. An output waveform A' is generated when the boosting transformer is driven under a driving condition in which the output voltage reaches the target voltage or more. A time constant for the waveform A' is the same as that for the output waveform B. On the other hand, a time to elapsed until the output voltage reaches the same target voltage becomes significantly shorter for the waveform A' than that for the waveform B. In the high-voltage generation apparatus, the output voltage is raised to the target voltage or the vicinity of the target voltage using a steep and high slew rate portion TH in the transient state, and a constant voltage control circuit (hardware) then performs high-speed feedback control for maintaining the target voltage at high speed, like for a waveform A.

A high-voltage generation apparatus according to a first exemplary embodiment of the present invention divides a transient-state period elapsed from the start of startup until an output voltage reaches a target voltage into a high-speed startup period T1 immediately after the start of startup and a constant voltage control waiting period T2 elapsed before the output voltage reaches the target voltage, and sets on-duty widths of driving signals (PWM signals in the present exemplary embodiment) for driving the boosting transformer, respectively, in the high-speed startup period T1 and the constant voltage control waiting period T2. In the constant voltage control waiting period T2 elapsed before the output voltage reaches the target voltage, the on-duty width is decreased, and a startup capability of the high-voltage generation apparatus is suppressed to be comparatively low. The high-speed startup period T1 in a transient state is variably set according to a correction value corresponding to the magnitude of the target voltage having a polarity with the added magnitude of the potential (voltage) having an opposite polarity at the load unit.

Figure 18A:
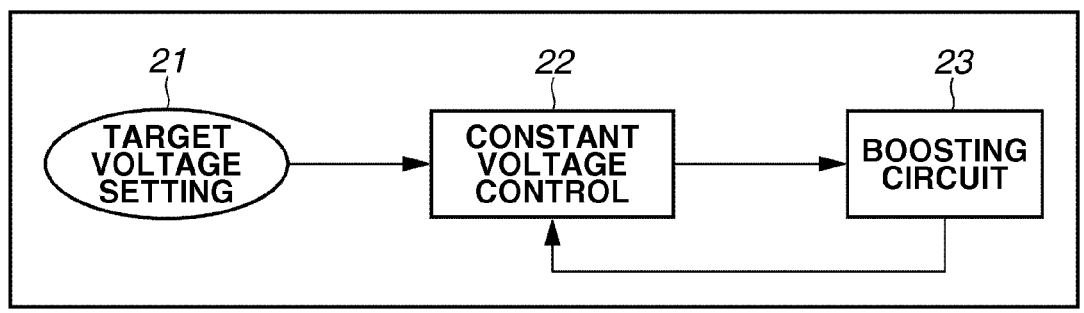
FIGS. 18A to 18D are block diagrams schematically illustrating a configuration of a high-voltage generation apparatus.
Figure 18B:
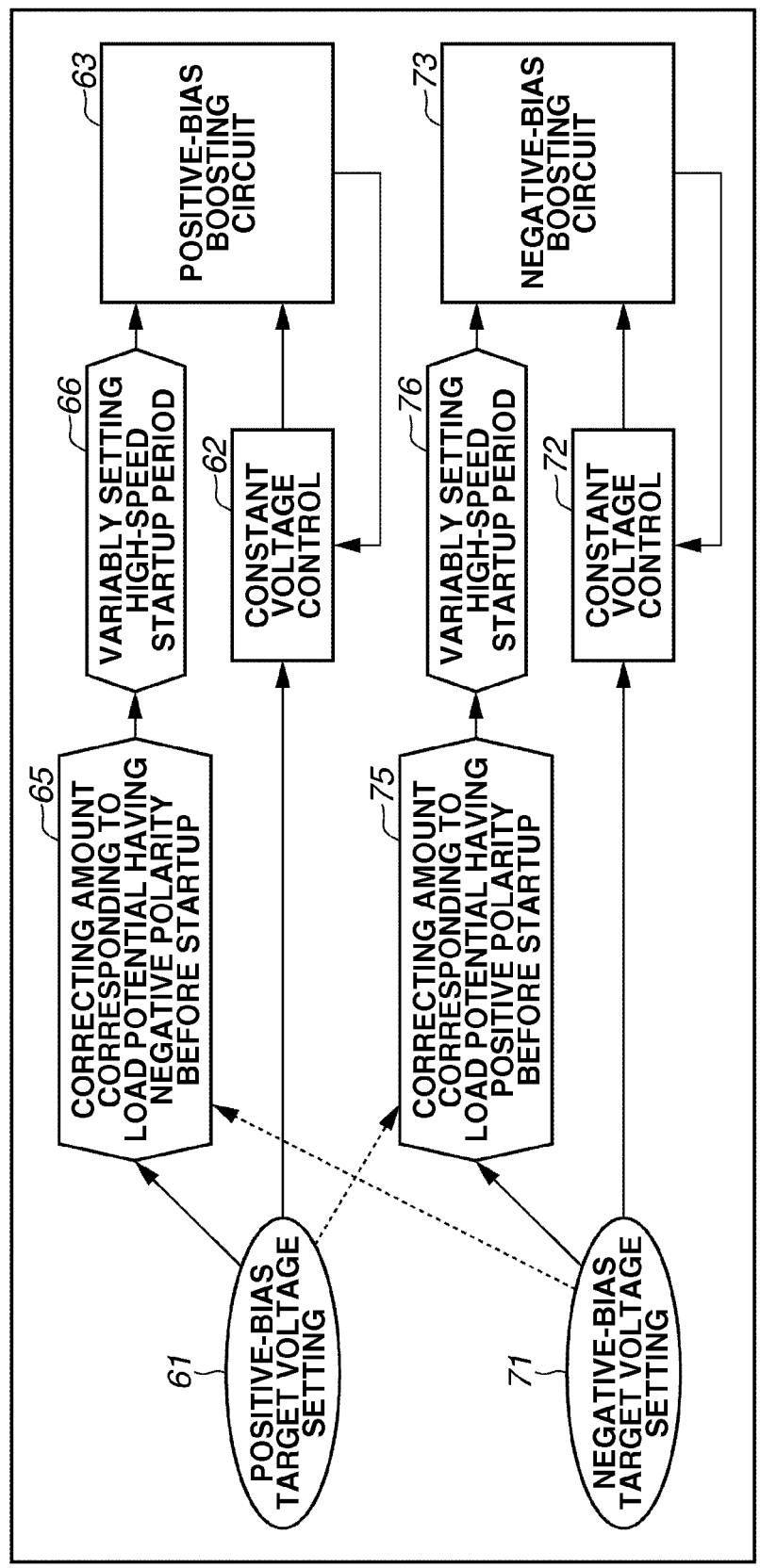

FIG. 18B is a block diagram schematically illustrating principal functions of the high-voltage generation apparatus according to the present exemplary embodiment. FIG. 18A illustrates a conventional high-voltage generation apparatus. In the conventional high-voltage generation apparatus, a constant voltage control block 22 monitors an output unit in a boosting circuit unit 23 so that an output voltage set by a target voltage setting unit 21 is obtained while performing feedback-control to an input unit. The high-voltage generation apparatus according to the present exemplary embodiment illustrated in FIG. 18B further includes blocks (66, 76) capable of variably setting the high-speed startup period T1, and blocks (65, 75) for correcting amounts varied by the blocks (66, 76) according to the magnitudes of load potentials having opposite polarities.

A configuration of the high-voltage generation apparatus according to the present exemplary embodiment will be described with reference to FIG. 4. The high-voltage generation apparatus illustrated in FIG. 4 includes high-voltage generation circuits, respectively having a positive polarity and a negative polarity, including an analog circuit, and an application specific integrated circuit (ASIC) 7 for generating a hardware control signal and outputting the generated hardware control signal to each of the high-voltage generation circuits. The high-voltage generation apparatus includes a microcontroller 1 for controlling and setting an output state of the hardware control signal generated by the ASIC 7. Further, portions composed of the analog circuit in the high-voltage generation circuits respectively include boosting transformers T1 and T51, boosting circuits, and comparators, which are respectively formed for positive and negative biases. The high-voltage generation apparatus further includes an output voltage detection circuit 4, and an offset potential setting circuit 3.

The microcontroller 1 sets data at predetermined timing for a register 36 in the ASIC 7 to set a target voltage, set ON/OFF timing, set an on-duty width of a PWM signal, and set a timer time, described below, in the high-voltage generation apparatus. The ASIC 7 outputs a high-voltage control signal HVCNT for setting a target voltage of the high-voltage generation circuit as an analog signal to the exterior via a digital-to-analog (D/A) converter, outputs a PWM signal HVPWM for switching the high-voltage generation circuit to the exterior, and receives a target voltage reach signal /HVATN indicating that an output voltage of the high-voltage generation circuit has reached the target voltage from the exterior. The high-voltage control signal HVCNT may be output in the form of a PWM signal, or may be converted into a direct-current (DC) voltage by a high-order low-pass filter or the like having an improved response characteristic at a frequency of the PWM signal. A large number of units are similarly configured for positive and negative biases. Therefore, the unit for a positive bias for generating a high voltage having a positive polarity and the unit having a negative bias for generating a high voltage having a negative polarity are respectively hereinafter assigned (P) and (N); the same shall apply hereinafter, and (P) and (N) are deleted from units that are common between both positive and negative biases.

An operation of the high-voltage generation circuit in the high-voltage generation apparatus illustrated in FIG. 4 will be described below. The boosting transformer T1 for a positive bias is switched in response to the PWM signal HVPWM (P) output from the ASIC 7. The output voltage detection circuit 4 divides a high voltage output from the boosting transformer T1, to detect a divided voltage Vdt. A comparator CMP10 performs comparison calculation of the detected divided voltage Vdt with a target voltage Vtgt (P) set in response to the high-voltage control signal HVCNT (P). Feedback control of an on-duty width of the PWM signal HVPWM (P) output from the ASIC 7 is performed according to a comparison calculation result. Feedback control is similarly performed for a negative bias.

A configuration of a hardware logic circuit loaded in the ASIC 7 will be described below. The ASIC 7 includes a circuit block 37 for generating and controlling a signal for a positive bias, and a block 87 for generating and controlling a signal for a negative bias. A trigger setting unit 130 formed in the register 36 determines timing for updating output values of the high-voltage control signals HVCNT (P) and HVCNT (N), and is controlled by the microcontroller 1.

Figure 4:
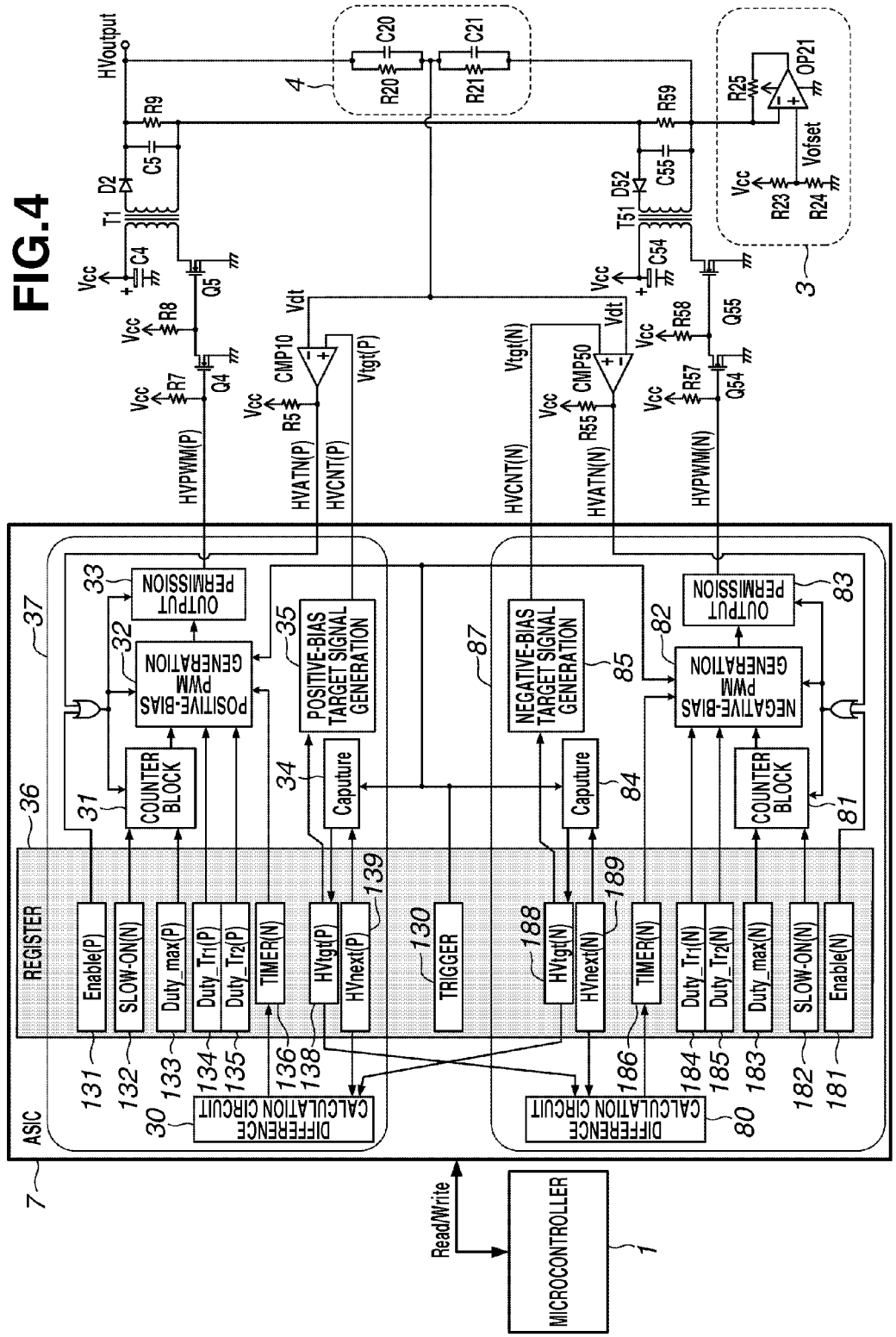
FIG. 4 illustrates a circuit configuration of a high-voltage generation apparatus according to a first exemplary embodiment of the present invention.

Other setting units in the register 36 will be described below. The following are details of the inside of the register 36:

an Enable setting unit (131, 181) for permitting or stopping an output of a PWM signal a slow-on setting unit (132, 182) for setting a time width for gradually increasing an on-duty width of the PWM signal a DUTY_max setting unit (133, 183) for setting the maximum on-duty width of the PWM signal a DUTY_Tr1 setting unit (134, 184) for setting an on-duty width used in the high-speed startup period T1 a DUTY_Tr2 setting unit (135, 185) for setting an on-duty width used in the constant voltage control waiting period T2 a timer setting unit (136, 186) for setting a time width of the high-speed startup period T1 an HVnext setting unit (139, 189) for previously setting a target voltage of a positive-bias circuit captured when the subsequent trigger signal is output from the trigger setting unit 130 an HVtgt setting unit (138, 188) where the target voltage captured from the HVnext setting unit 139 in response to the trigger signal is held Each of the setting units is formed for positive and negative biases, and is assigned (P) and (N) in FIG. 4.

Circuit modules in the ASIC 7 will be described below. A difference calculation circuit (30, 80) in the ASIC 7 calculates a difference value between two set register values, and derives a timer time uniquely determined according to the calculated difference value. A counter block (31, 81) outputs on-duty widths that gradually increase from zero to the maximum on-duty width set in the DUTY_max setting unit (133, 183) with the time width set in the slow-on setting unit (132, 182) from PWM generation unit (32, 82). A startup capability of the high-voltage generation apparatus changes according to the maximum on-duty width. Therefore, the microcontroller 1 enables the DUTY_max setting unit (133, 183) to set the maximum on-duty width so that the startup capability can be easily adjusted without changing a component structure (e.g., the number of windings of the boosting transformer). The PWM generation unit (32, 82) outputs a PWM signal having the on-duty width set in the DUTY_Tr1 setting unit (134, 184) with the time width set in the timer setting unit (136, 186) and according to switching timing corresponding to the setting in the Enable setting unit (131, 181), and outputs, subsequently to the PWM signal, a PWM signal having the on-duty width set in the DUTY_Tr2 setting unit (135, 185). The on-duty width of the PWM signal is reduced to zero when the target voltage reach signal /HVATN indicating that the output voltage reaches the target voltage enters a low level. Then, the PWM generation unit (32, 82) is controlled to output a PWM signal having an on-duty width that gradually increases. An output permission unit (33, 83) stops outputting the PWM signal when either one of the Enable setting unit (131, 181) and the target voltage reach signal /HVATN enters a low level. A Capture unit (34, 84) for capturing data in the register 36 and updating the data captures data in the HVnext setting unit (139, 189) in response to a trigger signal, and writes the data into the HVtgt setting unit (138, 188). A target signal generation unit (35, 85) generates an analog signal based on the register value in the HVtgt setting unit (138, 188).

The following are functions of the hardware logic circuit in the ASIC 7 described above:

(a) The microcontroller 1 sets values of a register for setting a plurality of on-duty widths, a register for enabling output of a PWM signal, a register for setting an output target voltage, a register for setting a time width for gradually increasing an on-duty width of a PWM signal, and a register for setting a trigger signal for determining timing for updating an output value of a high-voltage control signal. The register for setting a plurality of on-duty widths includes a register for setting an on-duty width in the high-speed startup period T1, a register for setting an on-duty width in the constant voltage control waiting period T2, and a register for setting the maximum on-duty width of a PWM signal that can be generated in a constant voltage control area.

(b) An output target voltage is captured in an internal register from a previously set register value in response to the trigger signal.

(c) An analog signal that has followed the target voltage captured in the internal register is output to the outside of the ASIC 7 via the D/A converter.

(d) A correction value corresponding to the magnitude of a target voltage having a polarity that is currently being output with the added magnitude of a target voltage having an opposite polarity to be then output is calculated, and a timer time corresponding to the correction value is set and written into the register.

(e) A PWM signal having the on-duty width in the high-speed startup period T1 and a PWM signal having the on-duty width in the constant voltage control waiting period T2 are sequentially generated and output according to the timer time.

(f) The on-duty width of the PWM signal is instantaneously reduced to zero in response to the target voltage reach signal /HVATN input from the exterior.

(g) The on-duty width is increased in a step-by-step manner from zero to a predetermined on-duty width with the time width set in the register.

(h) Each of the functions is independently controlled as ones for positive and negative biases.

Figure 6:
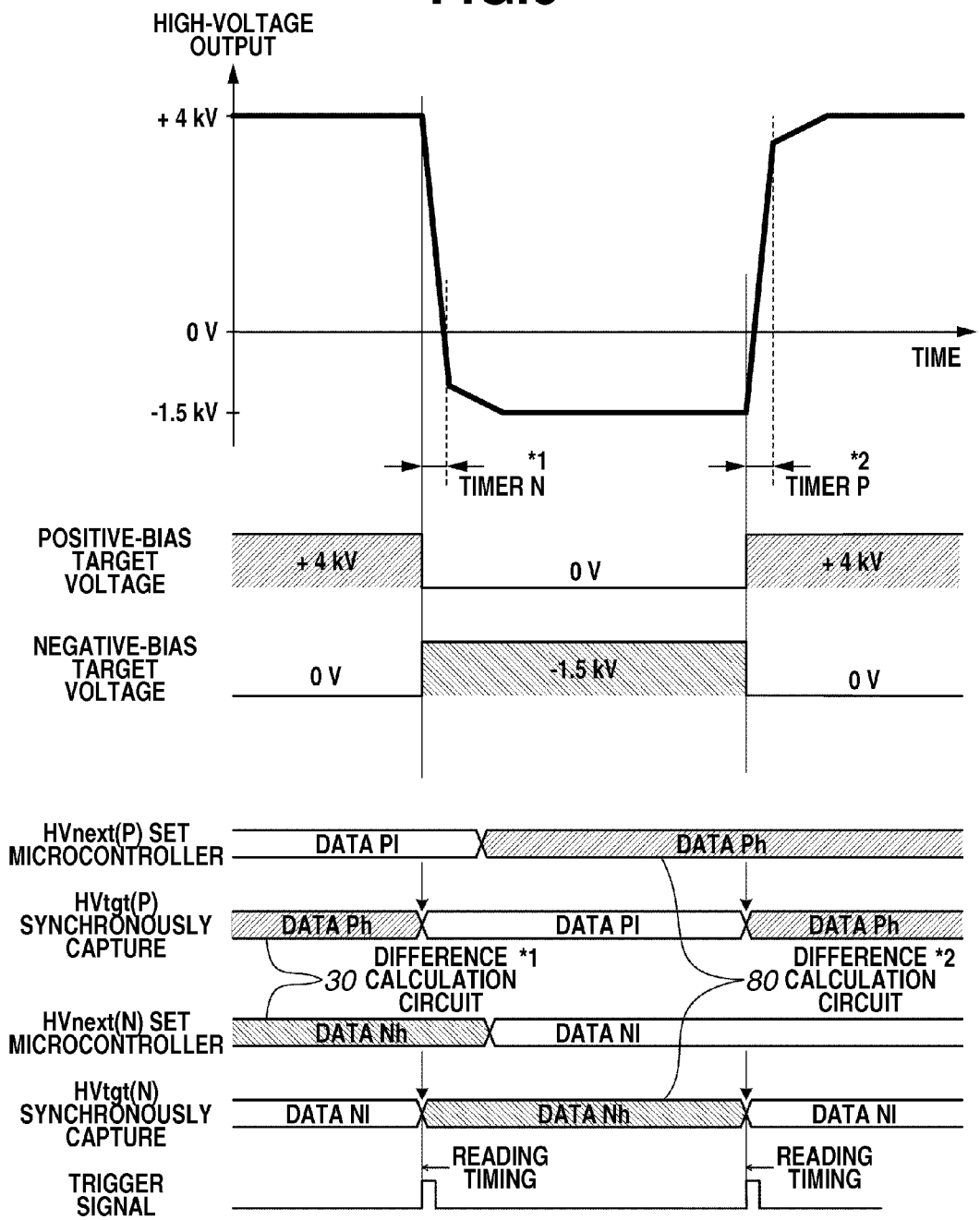
FIG. 6 illustrates timing between a high-voltage output waveform according to the first exemplary embodiment of the present invention relative to each signal.

Details of the functions of setting output target voltages for a positive bias and a negative bias and capturing the target voltages in the internal register in response to the trigger signal, which are described in the foregoing items (b) and (c), will be described with reference to FIG. 6. FIG. 6 illustrates timing between each signal and a voltage waveform having both positive and negative polarities output from the high-voltage generation apparatus according to the present exemplary embodiment. As an example, the output voltage is switched from a positive-bias output of +4 kV to a negative-bias output of −1.5 kV, and is then switched to the positive-bias output of +4 kV again.

The microcontroller 1 previously sets values to be set and updated at the subsequent trigger timing in the HVnext (P) setting unit 139 and the HVnext (N) setting unit 189. When a trigger signal is output, the previously set values of the HVnext (P) setting unit 139 and the HVnext (N) setting unit 189 are respectively captured in synchronization with a leading edge of the trigger signal in the HVtgt (P) setting unit 138 and the HVtgt (N) setting unit 188 so that a target voltage is updated. FIG. 6 illustrates a state where positive-bias output setting is changed from +4 kV to 0 V (off) and negative-bias output setting is changed from 0 V (off) to −1.5 kV in synchronization with the trigger signal so that an output polarity is switched. The positive-bias target signal generation unit 35 outputs an analog signal that has followed the updated value captured in the HVtgt (P) setting unit 138 to the outside of the ASIC 7. The target signal generation unit 85 outputs an analog signal that has followed the value captured in the HVtgt (N) setting unit 188 to the outside of the ASIC 7. The difference calculation circuit 30 calculates a correction value by adding the value of the HVtgt (P) setting unit 138 to the value of the HVnext (P) setting unit 139, to calculate a timer time. A time of a timer (N) in the high-speed startup period T1 is determined according to the timer time. A time of a timer (P) is also determined by a similar method.

Details of a method for determining (correcting) the timer time described in the foregoing item (d) will be described below. The difference calculation circuit (30, 80) calculates a correction value corresponding to a value of the HVtgt setting unit (138, 188) representing a target voltage having a polarity that is currently being output with an added value of the HVnext setting unit (139, 189) representing a target voltage having an opposite polarity to be updated at the subsequent trigger timing, and sets a timer time uniquely determined according to the calculated correction value in the timer setting unit (136, 186). The correction value in the difference calculation circuit (30, 80) in the present exemplary embodiment is found by a difference amount between the values of the HVtgt setting unit (138, 188) and the HVnext setting unit (139, 189) by providing the offset potential setting circuit 3.

Figure 5A:
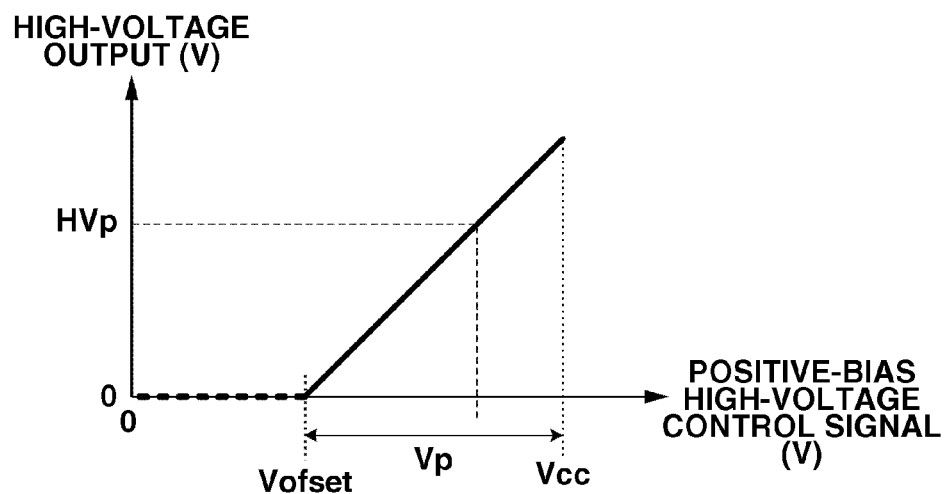
FIGS. 5A and 5B illustrate a relationship between high-voltage control signals for positive and negative biases and a high-voltage output according to first to third exemplary embodiments of the present invention.
Figure 5B:
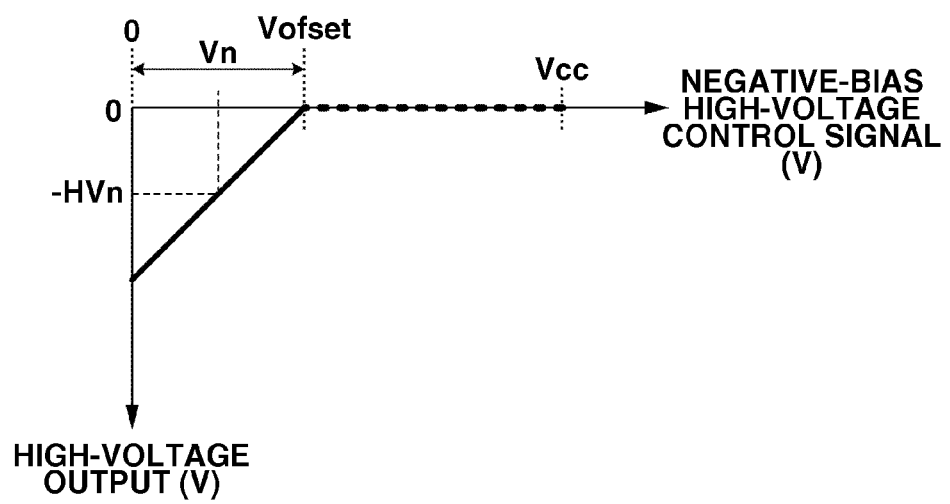

The offset potential setting circuit 3 enables detection of an output voltage regardless of positive and negative polarities by holding a voltage at one end of the output voltage detection circuit 4 at not a ground (GND) potential but a predetermined potential Vofset, to detect a load current with high accuracy. FIG. 5A illustrates a relationship between the high-voltage control signal HVCNT (P) and a high-voltage output, and FIG. 5B illustrates a relationship between the high-voltage control signal HVCNT (N) and a high-voltage output when the output voltage detection circuit 4 can detect positive and negative output voltages by providing the offset potential setting circuit 3. By providing the offset potential setting circuit 3, the high-voltage output is 0 V for positive and negative biases when an output value of the high-voltage control signal is Vofset. The positive bias indicates that the high-voltage control signal HVCNT (P) is set in a voltage range of Vofset to Vcc, and a high voltage of HVp is output when the high-voltage control signal HVCNT (P) is Vp.

Figure 17A:
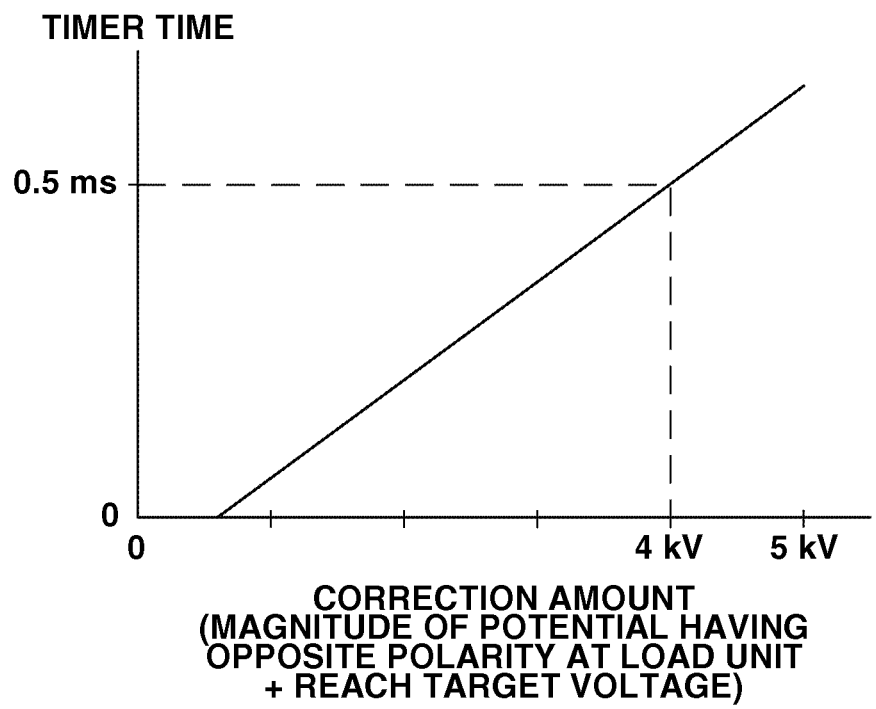
FIGS. 17A and 17B illustrate a relationship between conditions (a timer time and a slew rate) in a previously set high-speed startup period T1 and a correction value.
Figure 17B:
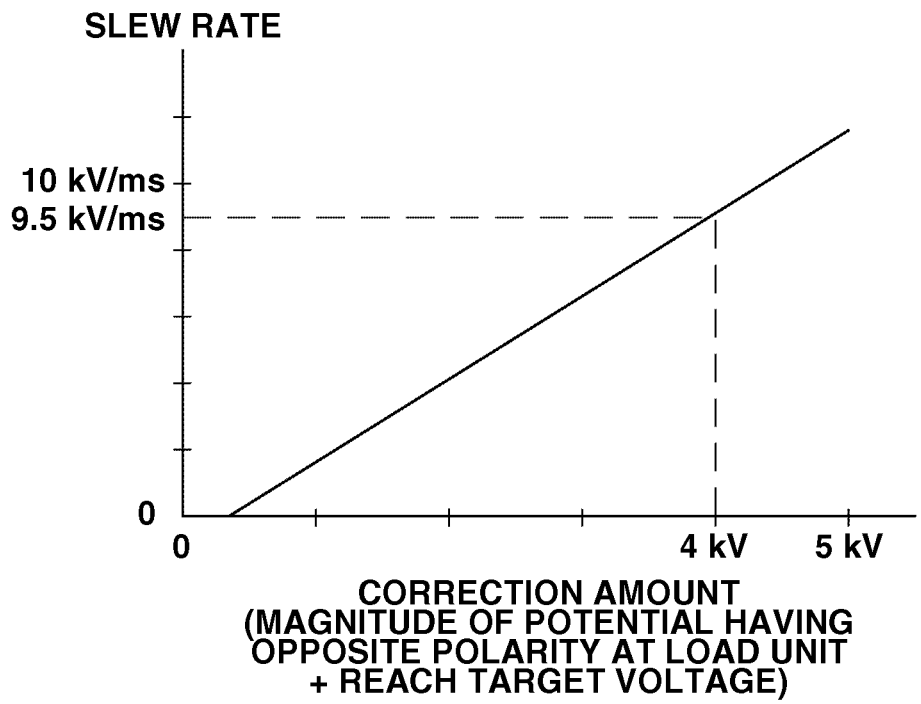

Therefore, a high voltage proportional to a voltage value (Vp−Vofset) obtained by subtracting Vofset from a voltage value of the high-voltage control signal HVCNT (P) is output. The negative bias indicates that the high-voltage control signal HVCNT (N) is set in a voltage range of 0 to Vofset, and a high voltage of HVn is output when the high-voltage control signal HVCNT (N) is Vn. Therefore, a high voltage proportional to a voltage (Vofset−Vn) obtained by subtracting a voltage value of the high-voltage control signal HVCNT (N) from Vofset is output. As a result, the above-mentioned correction value can be determined as |(Vp−Vofset)−(Vofset−Vn)|=|Vp−Vn|. The correction value calculated by the difference calculation circuit (30, 80) and the timer time in the timer setting unit (136, 186) have a relative relationship of linearity, as illustrated in FIGS. 17A and 17B, described below.

Generation of the timer time and the PWM signal, described in the foregoing item (e), will be described below with reference to FIG. 4. When the microcontroller 1 sets a register value in the trigger setting unit 130 so that the trigger signal is output, the PWM generation unit (32, 82) outputs a PWM signal having the on-duty width that has followed the DUTY_Tr1 setting unit (134, 184) for setting the on-duty width in the high-speed startup period T1 with the time width based on the timer time set in the timer setting unit (136, 186). Since the ASIC 7 executes the output of the PWM signal, a time required to increase the on-duty width to this on-duty width from zero is not required, and the PWM signal having the on-duty width can be instantaneously output, starting at its first pulse. When the timer time set in the timer setting unit (136, 186) has elapsed, the PWM generation unit (32, 82) then outputs a PWM signal having the on-duty width that has followed the DUTY_Tr2 setting unit (135, 185) for setting the on-duty width in the constant voltage control waiting period T2.

More specifically, the PWM generation unit (32, 82) outputs a PWM signal having a large on-duty width, starting at its first pulse, immediately after the startup of the high-voltage generation apparatus is started, to instantaneously raise an output voltage at a high slew rate. After the timer time previously set has elapsed, the PWM generation unit (32, 82) then outputs a PWS signal having an on-duty width at a low slew rate so that no overshoot occurs. The timer time is variably set to a value, which is maintained in a relationship of linearity with a correction value corresponding to the magnitude of a target voltage having a polarity that is currently being output with the added magnitude of a target voltage having an opposite polarity to be then updated. Therefore, the high-voltage generation apparatus can be started up with a time width at the time of startup that has been varied according to a set correction value between the polarities. After a lapse of the timer time, switching from the high-speed startup period T1 to the constant voltage control waiting period T2 is performed.

Even in a high-voltage generation apparatus a startup capability of which is rapidly increased, a timer time during which a PWM signal having a large on-duty width to be first output is output is corrected according to a correction value between polarities. More specifically, even if a load potential is a negative potential having an opposite polarity outside an output range of the high-voltage generation apparatus, the timer time serving as the high-speed startup period T1 is corrected according to the magnitude of the negative potential. When the correction value is large, therefore, a switching time is lengthened in response to the PWM signal having the large on-duty width so that a startup period is shortened. On the other hand, when the correction value is small, the switching time is shortened so that an overshoot is reduced. More specifically, in a high-voltage power source apparatus that outputs both positive-polarity and negative-polarity biases, an output voltage can reach a target voltage without any overshoot and in a short time regardless of whether the load potential having an opposite polarity is high or low before the startup.

Details of control of the on-duty width of the PWM signal in response to the target voltage reach signal /HVARN, described in the above-mentioned items (f) and (g), will be described below. Peripheral circuits including the boosting transformer T1 formed in the high-voltage generation circuit for a positive bias will be first described, and an operation of the comparator CMP10 that outputs the target voltage reach signal /HVARN (P) will be then described. The high-voltage generation circuit for a negative bias is operated similarly to the high-voltage generation circuit for a positive bias, and hence the description thereof is not repeated.

The PWM signal HVPWM (P) output from the ASIC 7 is input to a gate terminal of a field effect transistor (FET) Q4. The FET Q4, a power source voltage Vcc, and a resistor R8 drive a gate terminal of a power metal oxide semiconductor field effect transistor (power MOSFET) Q5 in response to the PWM signal HVPWM (P) input to the gate terminal of the FET Q4. The power MOSFET Q5 switching-drives the boosting transformer T1. The boosting transformer T1, which has been switching-driven, outputs a high pulsating voltage. The high pulsating voltage output by the boosting transformer T1 is output to a load unit HVoutput after being rectified by a rectifier including a high-voltage diode D2, a high-voltage capacitor C5, a resistor R9, and the output voltage detection circuit 4 and changed into a DC voltage. The output voltage detection circuit 4 divides the high voltage output to the load unit HVoutput, to detect a divided voltage Vdt. The comparator CMP10 monitors the detected divided voltage Vdt, and compares the divided voltage Vdt with a target voltage Vtgt (P) set in response to the high-voltage control signal HVCNT (P). The comparator CMP10, which has compared the detected voltage Vdt and the target voltage Vtgt (P), generates a high-level output when the detected voltage Vdt is the target voltage Vtgt or less, and generates a low-level output when the detected voltage Vdt is the target voltage Vtgt (P) or more.

The ASIC 7 instantaneously masks the PWM signal HVPWM (P) output by the output permission unit 33 when the target voltage reach signal /HVATN (P) enters a low level, to instantaneously reduce an on-duty width of the PWM signal HVPWM (P) to zero. The on-duty width becomes a low-level logic in the PWM signal HVPWM (P) output from the ASIC 7, and becomes a high-level logic at the gate terminal of the power MOSFET Q5. More specifically, the ASIC 7 outputs a signal fixed at a high level as the PWM signal HVPWM (P). When the signal fixed at a high level is instantaneously output, the ASIC 7 turns off the FET Q4, and instantaneously turns off the power MOSFET 5 connected thereto, to instantaneously turn off the high-voltage generation circuit.

On the other hand, when the target voltage reach signal /HVATN (P) is changed from a low level to a high level, the counter block 31 outputs to the PWM generation unit 32 data set in the DUTY_max (P) setting unit 133 so that the on-duty width is increased in a step-by-step manner toward the on-duty width based on the data. A time width used when the on-duty width of the PWM signal is increased in a step-by-step manner is determined by a register value in the slow-on setting unit 132. The PWM generation unit 32 outputs a PWM signal determined by the register value in the slow-on setting unit 132 to the outside of the ASIC 7.

More specifically, the ASIC 7 instantaneously reduces the on-duty width of the PWM signal HVPWM (P) to zero when the detected voltage Vdt exceeds the target voltage Vtgt (P), to instantaneously turn off the high-voltage generation circuit. The ASIC 7 gives a time constant to an increase in the on-duty width, to slowly turn on the high-voltage generation circuit when the detected voltage Vdt falls below the target voltage Vtgt. As a result, a voltage vibration (also referred to as a ripple or a hunting) generated by feedback control for holding a constant voltage can be significantly reduced.

Figure 7A:
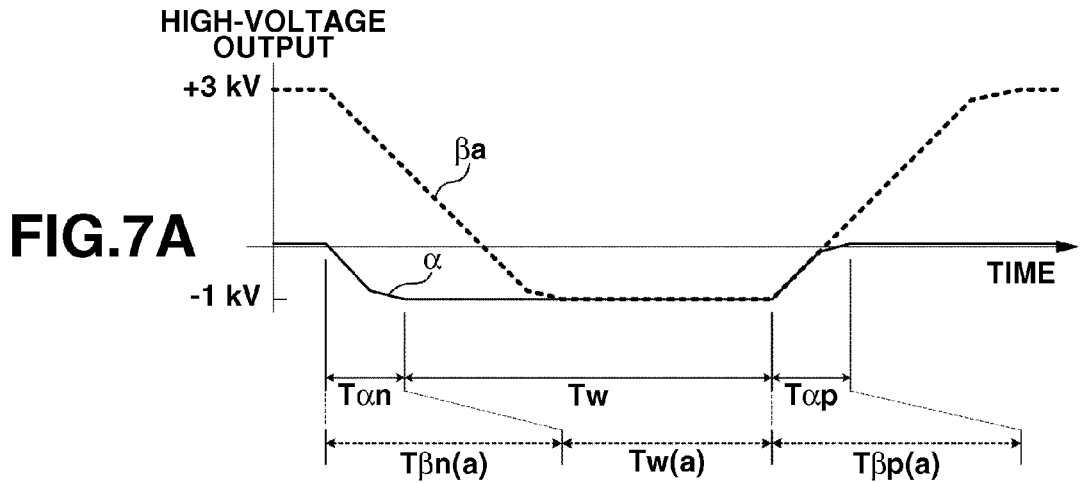
FIGS. 7A, 7B, and 7C illustrate waveforms generated when positive and negative biases are alternately output in a state where a high-voltage output unit includes a capacitive load unit.
Figure 7B:
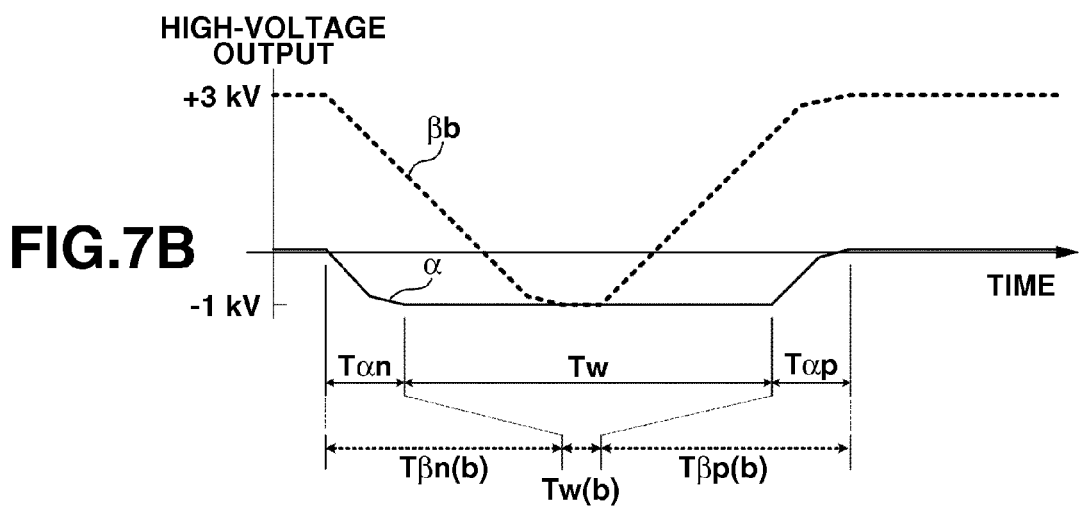
Figure 7C:
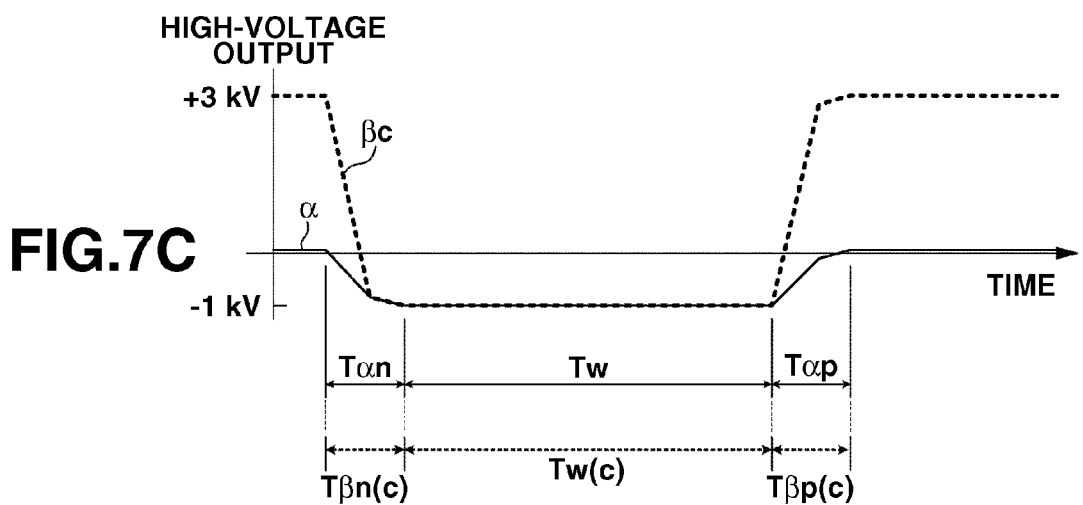

FIGS. 7A to 7C, FIG. 8, and FIGS. 9A and 9B illustrate specific examples of high-voltage waveforms generated by the analog circuit and the ASIC 7 in the high-voltage generation apparatus that outputs both positive and negative polarities, described above, as contrasted with a high-voltage waveform generated when the speed of the conventional high-voltage generation apparatus is simply increased. FIGS. 7A to 7C illustrate high-voltage waveforms generated when a positive-polarity bias and a negative-polarity bias are alternately output while the high-voltage output unit has a capacitive load. A waveform α illustrated in FIGS. 7A to 7C is generated when a negative-polarity bias is generated by setting a target voltage to −1 kV from a state where a load potential is 0 V, and is then switched toward a positive polarity so that the target voltage becomes 0 V. The waveform α includes a negative-bias rise time Tαn, a feedback control period Tw during which a potential of −1 kV is held, and a positive-bias rise time Tαp.

FIG. 7A illustrates, when a load potential is charged to not 0 V but an opposite polarity, a waveform βa generated when the high-voltage generation apparatus is turned on and off at the same timing as that for the waveform α. The waveform βa is generated when a negative-polarity bias is generated by setting a target voltage to −1 kV from a state where a load potential is charged to +3 kV, and is then switched toward a positive polarity by setting a target voltage to +3 kV. The waveform βa includes a negative-bias rise time Tβn(a), a feedback control period Tw(a) during which a potential of −1 kV is held, and a positive-bias rise time Tβp(a). The waveform βa differs from the waveform α in that the load potential is required to be repeatedly charged to positive and negative polarities so that the rise time is longer. As a result, the feedback control period during which a potential of −1 kV is held decreases from Tw to Tw(a) while a time required to return to a load potential of +3 kV is delayed by (Tβp(a)−Tαp). Specific examples of voltages illustrated in FIGS. 7A to 7C may be other examples of voltages in which the ratio of a load potential generated by a residual electric charge previously charged into a load unit to a target voltage of a polarity bias at which the high-voltage generation apparatus is turned off increases, in which case a delay similarly occurs.

Figure 1A:
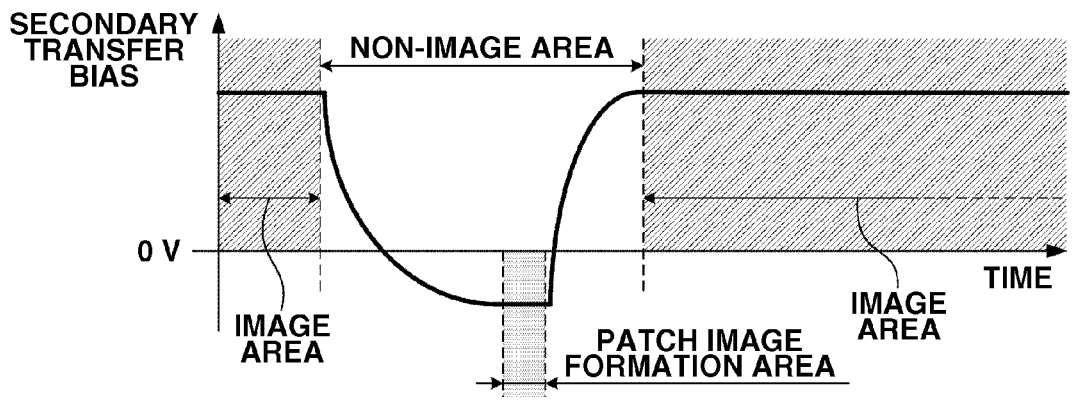
FIGS. 1A to 1C illustrate a time relationship between an area between sheets (a non-image area) and a patch image formation area in an image forming apparatus.
Figure 1B:
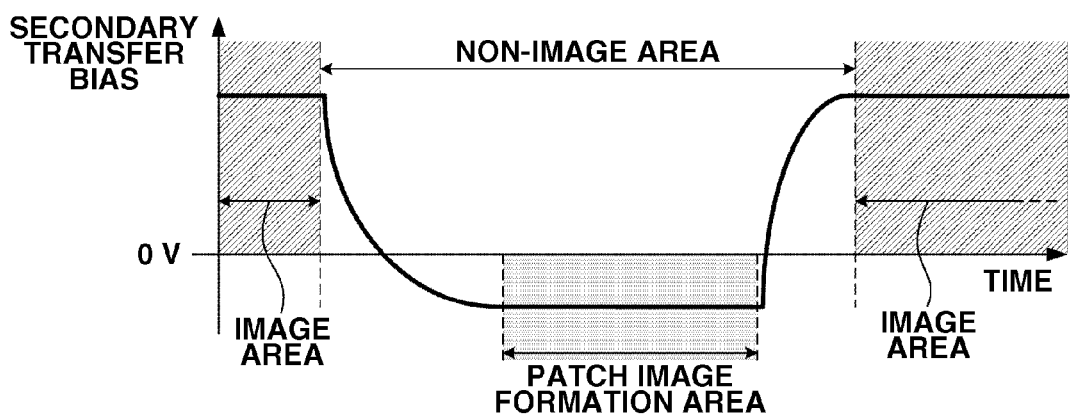
Figure 1C:
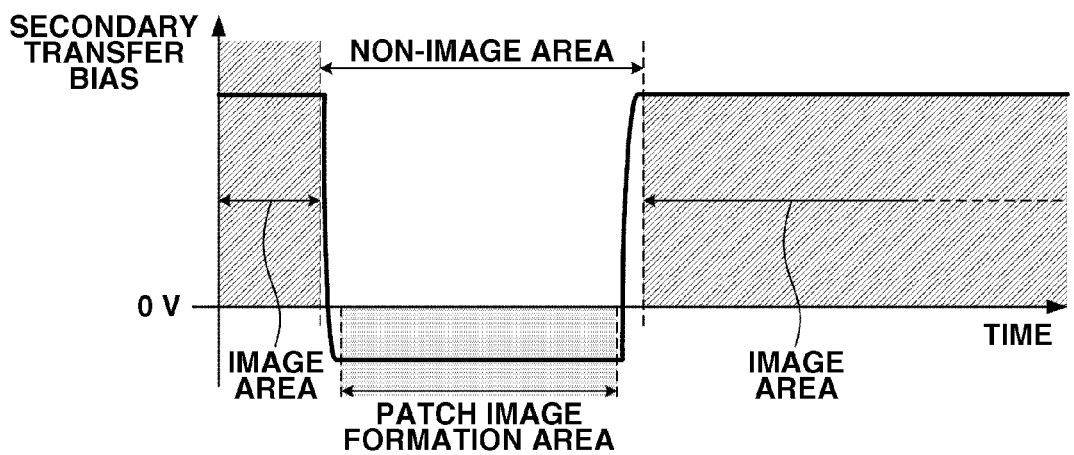

FIG. 7B illustrates an example in which ON/OFF timing of the high-voltage generation apparatus is changed so that a time required to return to a load potential of +3 kV is similar to that for the waveform α. While a period during which the load potential is +3 kV is similar to that for the waveform α, a feedback control period during which a potential of −1 kV is held decreases to Tw(b). This state corresponds to a significant shortening of a period during which a patch image is formed in an image forming apparatus, as described with reference to FIG. 1A.

FIG. 7C illustrates a waveform βc corresponding to the present exemplary embodiment in which a startup capability (a slew rate) is rapidly improved so that a startup time is shortened even when a load potential is charged to an opposite polarity. The waveform βc includes a negative-bias rise time TβnC, a feedback control period TwC during which a potential of −1 kV is held, and a positive-bias rise time TβpC. The waveform βc is raised at a steeper and higher slew rate than the waveforms α, βa, and βb so that the startup time is shortened to one similar to that for the waveform α.

Figure 8:
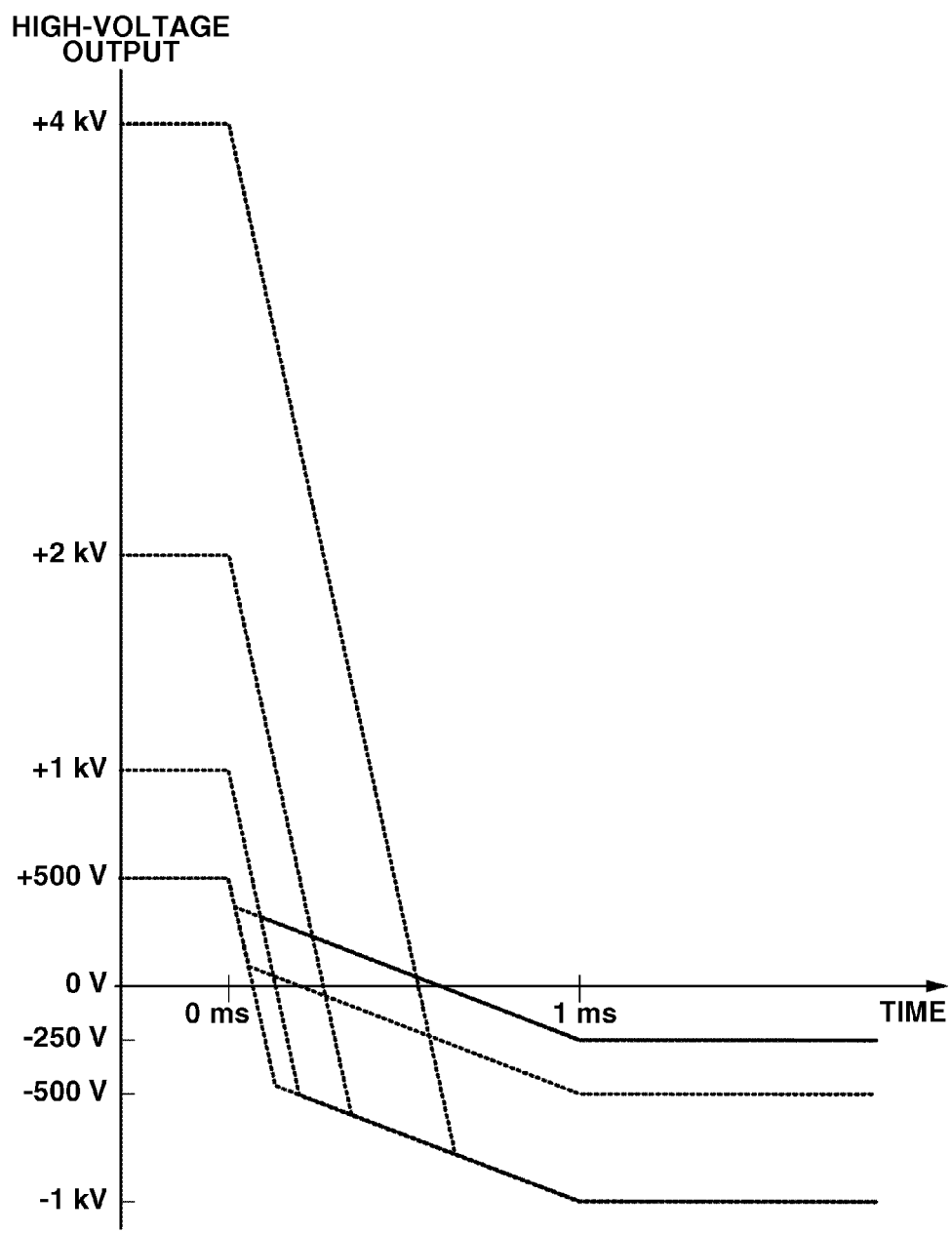
FIG. 8 illustrates high-voltage waveforms at the time of startup according to the first exemplary embodiment of the present invention.
Figure 9A:
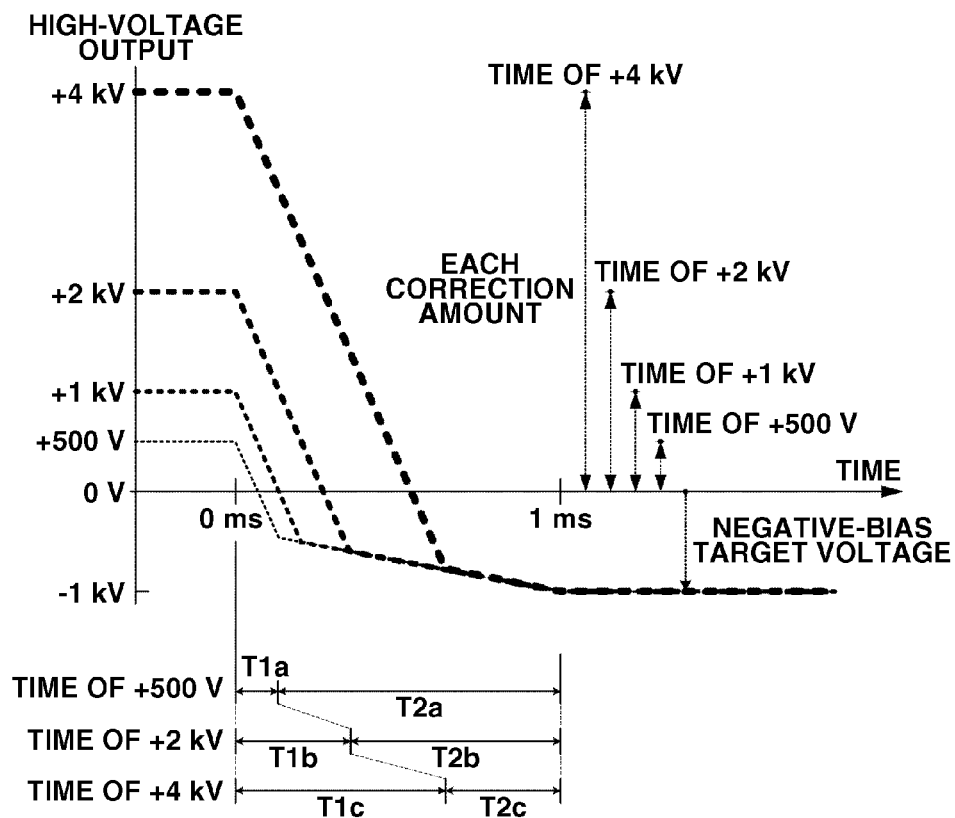
FIGS. 9A and 9B illustrate high-voltage waveforms at the time of startup according to the first exemplary embodiment of the present invention for each condition.
Figure 9B:
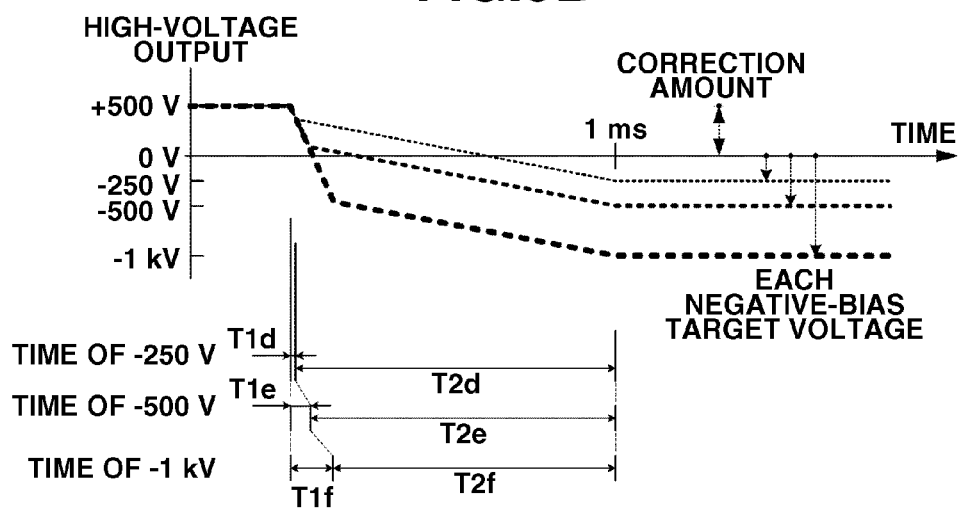

FIG. 8 illustrates waveforms generated when the time width of the high-speed startup period T1 is variably set to start the high-voltage generation apparatus in a state where the load unit is charged with a potential having an opposite polarity according to a correction value considering the magnitude of the potential having the opposite polarity. FIG. 8 illustrates examples of respective waveforms, in which a negative-polarity bias is raised to target voltages (−250 V, −500 V, and −1 kV) from states where the load unit is charged with potentials (+500 V, +1 kV, +2 kV, and +4 kV). A steep and high slew rate obtained when the negative-polarity bias is raised and a gentle and low slew rate obtained before the negative-polarity bias reaches the target voltage are common among the waveforms. FIGS. 9A and 9B illustrate some of the waveforms extracted using the same parameter from FIG. 8.

FIG. 9A illustrates waveforms generated when a negative-polarity bias is raised to a target voltage of −1 kV from a state where a load unit is charged with potentials (+500 V, +2 kV, +4 kV), extracted from FIG. 8. In FIG. 9A, the waveforms respectively include high-speed startup periods T1a, T1b, and T1c and constant voltage control waiting periods T2a, T2b, and T2c elapsed before the negative-polarity bias reaches the target voltage having a polarity. The magnitude of a load potential charged to an opposite polarity becomes a correction amount. The high-speed startup period is variably set according to a correction value obtained by adding the correction amount to the magnitude of the target voltage of the negative-polarity bias. In all the waveforms, the negative-polarity bias reaches the target voltage of −1 kV in 1 ms.

FIG. 9B illustrates waveforms generated when a negative-polarity bias is raised to target voltages (−250, −500 V, and −1 kV) from a state where the load unit is charged with a potential of +500 V, extracted from FIG. 8. In FIG. 9B, the waveforms respectively include high-speed startup periods T1d, T1e, and T1f and constant voltage control waiting periods T2d, T2e, and T2f elapsed before the negative-polarity bias reaches the target voltage. The high-speed startup periods T1d, T1e, and T1f are variably set according to a correction value corresponding to the magnitude of the target voltage having a polarity of the negative-polarity bias with the added magnitude of a load potential charged to an opposite polarity. In all the waveforms, the negative-polarity bias reaches the target voltage of −1 kV in 1 ms.

FIG. 17A illustrates a relationship between a timer time for variably setting the high-speed startup period T1 and a correction value considering the magnitude of the load potential charged to the opposite polarity, described with reference to FIG. 8 and FIGS. 9A and 9B. FIG. 17A indicates that the timer time serving as the high-speed startup period T1 is set proportional to a correction value corresponding to the magnitude of a target voltage having a polarity with the added magnitude of a potential having an opposite polarity at a load unit. More specifically, the timer time in the high-speed startup period T1 is variably set in the relationship illustrated in FIG. 17A so that a rise in an output of the high-voltage generation apparatus has a waveform as illustrated in FIG. 8. If the correction amount is 4 kV in FIG. 17A, for example, the timer time to be corrected is 0.5 ms, and a slew rate is 9.5 kV/ms.

As described above, according to the present exemplary embodiment, when an output voltage is switched from a voltage having a predetermined polarity to a voltage having a polarity opposite to the predetermined polarity, a timer time variably set is previously provided according to a correction value corresponding to the magnitude of the target voltage having a polarity with the added magnitude of the potential having an opposite polarity (the potential having a predetermined polarity) at the load unit, and the on-duty width of the PWM signal in the high-speed startup period T1 is variably set at the timer time. Thus, the high-voltage generation circuit can be started up in a state where the on-duty width at the time of startup is varied with a high resolution according to the correction value even if the potential having the opposite polarity at the load unit has various large and small values. As a result, the output voltage can reach the target voltage in a short time independently of the magnitude of the potential having the opposite polarity at the load unit.

A second exemplary embodiment of the present invention will be described below. A high-voltage generation apparatus according to the second exemplary embodiment divides a transient-state period elapsed from the start of startup of the high-voltage generation apparatus until an output voltage reaches a target voltage into a high-speed startup period T1 immediately after the start of the startup and a constant voltage control waiting period T2 elapsed before the output voltage reaches the target voltage. An on-duty width of a driving signal for driving a boosting transformer (a PWM signal in the present exemplary embodiment) is set in each of the high-speed startup period T1 and the constant voltage control waiting period T2. In the constant voltage control waiting period T2 elapsed before the output voltage reaches the target voltage, the on-duty width of the PWM signal is decreased so that a startup capability of the high-voltage generation apparatus is set comparatively low. A slew rate in the high-speed startup period T1 is variably set according to a correction value corresponding to the magnitude of the target voltage having a polarity with the added magnitude of a potential having an opposite polarity at a load unit. Therefore, in the present exemplary embodiment, the PWM signal having the on-duty width variably set while a relationship of linearity with the correction value is maintained is generated. With the start of the startup, switching is started using the PWM signal having the on-duty width variably set so that the output voltage reaches the target voltage at a steep and high slew rate in a transient state.

Figure 18C:
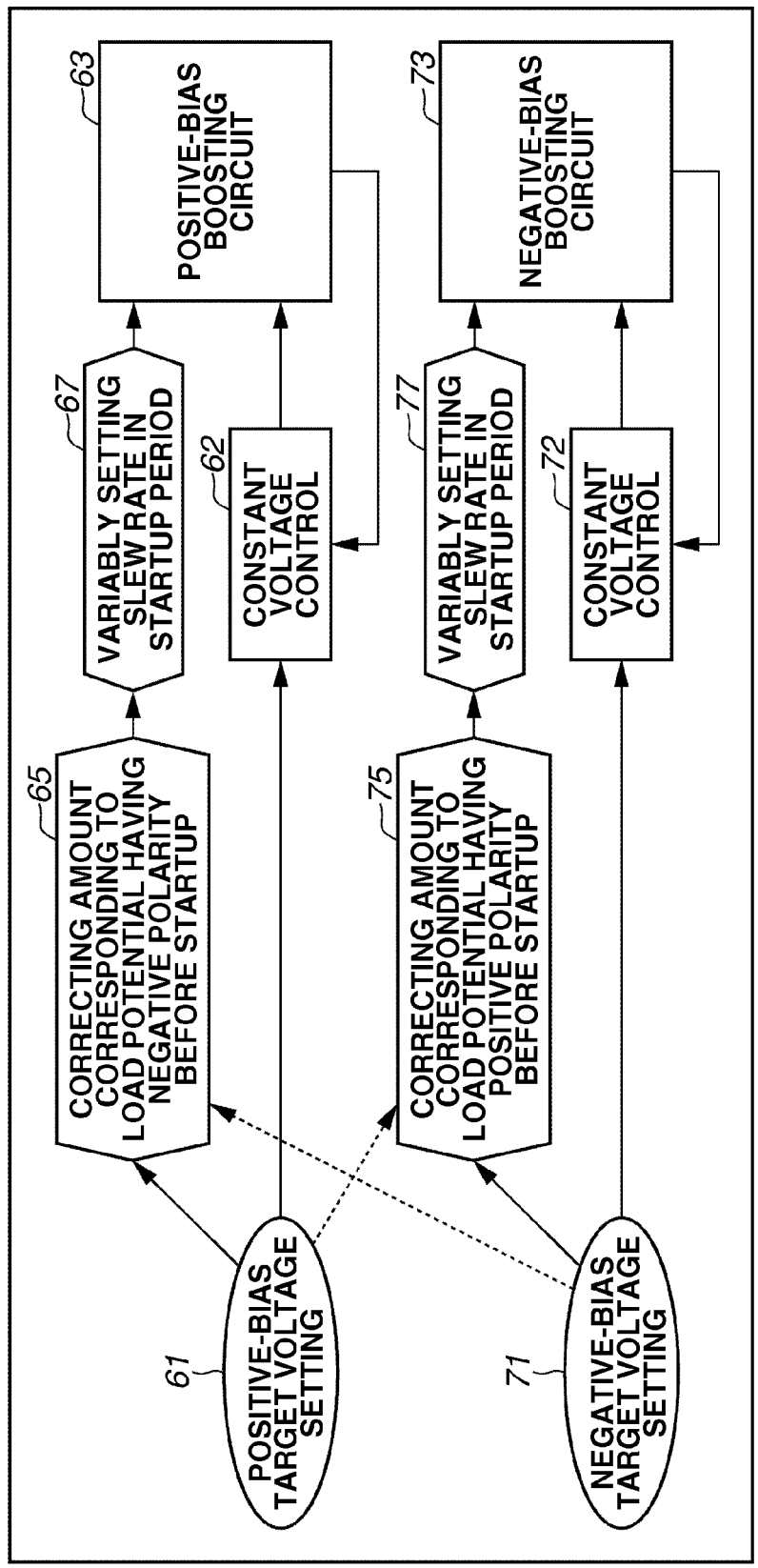

FIG. 18C is a block diagram schematically illustrating principal functions of the high-voltage generation apparatus according to the present exemplary embodiment. The high-voltage generation apparatus according to the present exemplary embodiment further includes a block (67, 77) capable of variably setting a slew rate in the high-speed startup period T1, and a block (65, 75) for correcting a variable amount in the block (67, 77) according to the magnitude of a potential having an opposite polarity at a load unit in addition to the conventional high-voltage generation apparatus illustrated in FIG. 18A.

Figure 10:
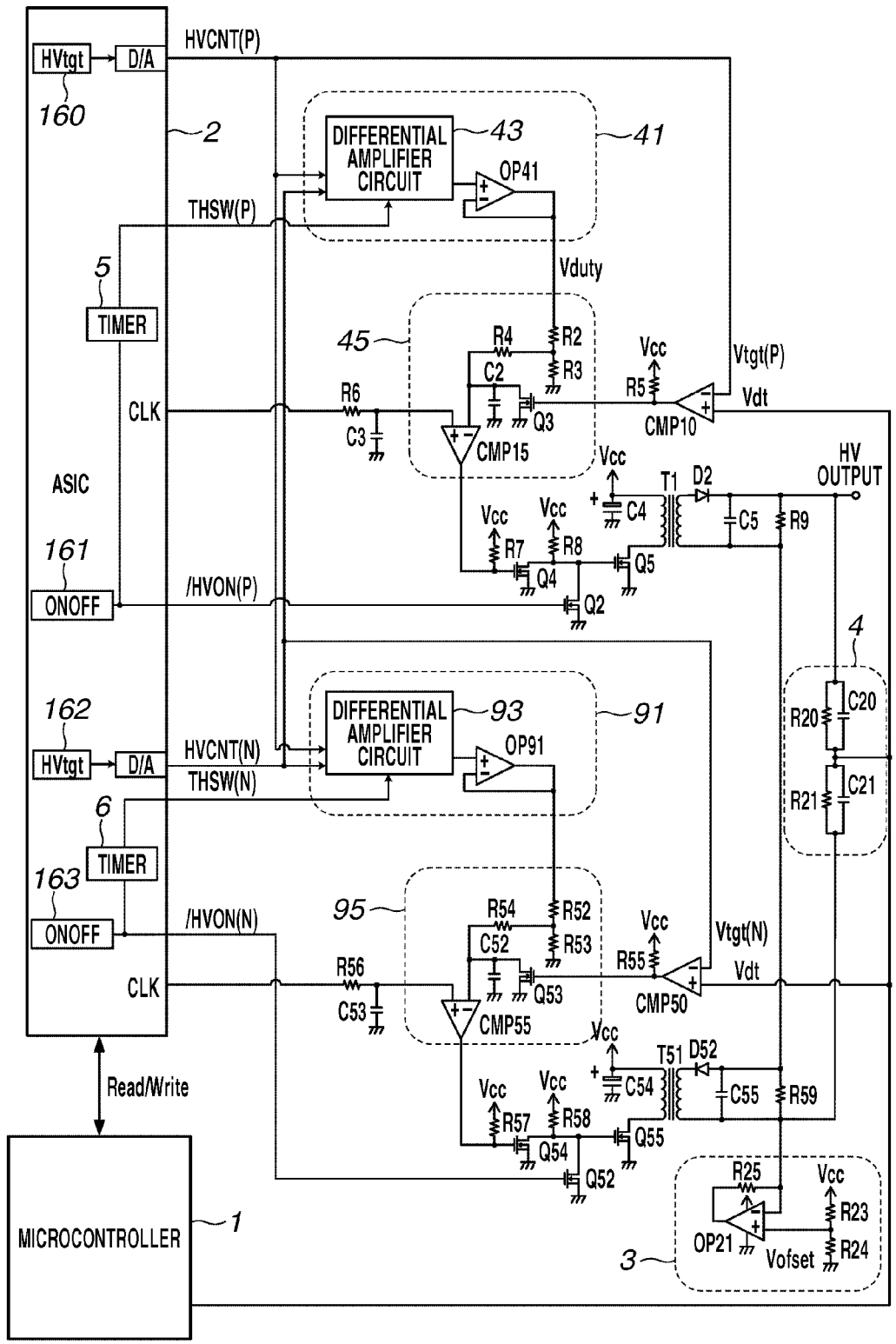
FIG. 10 illustrates a circuit configuration of a high-voltage generation apparatus according to a second exemplary embodiment of the present invention.

FIG. 10 illustrates a configuration of the high-voltage generation apparatus according to the present exemplary embodiment. Similar constituent elements and signals to those previously described in the first exemplary embodiment are assigned the same reference numerals and symbols, and hence the description thereof is not repeated. The high-voltage generation apparatus illustrated in FIG. 10 includes high-voltage generation circuits, respectively having a positive polarity and a negative polarity, including an analog circuit, and an ASIC 2 for generating a hardware control signal to be output to the high-voltage generation circuits, and a microcontroller 1 for controlling and setting an output state of the hardware control signal from the ASIC 2. The portion composed of the analog circuit in the high-voltage generation circuit includes a boosting transformer (T1, T51), a boosting circuit, a PWM generation circuit (45, 95) for generating a PWM signal for driving the boosting transformer (T1, T51), a maximum DUTY setting circuit (41, 91), and a comparator (CMP10, CMP50) for each of positive and negative biases. The high voltage generation apparatus further includes an output voltage detection circuit 4 and an offset potential setting circuit 3.

The microcomputer 1 controls a change in a target voltage in the high-voltage generation apparatus and ON/OFF timing by setting data at predetermined timing for an HVtgt unit (160, 162) serving as a target voltage setting register and an ON/OFF setting unit (161, 163) serving as an ON/OFF setting register, which are provided in the ASIC 2. The ASIC 2 outputs a high-voltage control signal HVCNT corresponding to the HVtgt unit (160, 162) as an analog signal to the exterior via a D/A converter. The microcontroller 1 outputs an ON/OFF control signal /HVON corresponding to the ON/OFF setting unit (161, 163) and a clock signal CLK having a predetermined period used in the high-voltage generation circuit to the exterior. A timer 5 generates a timing signal THSW (P), which is delayed by a predetermined time from the ON/OFF control signal /HVON, and outputs the generated timing signal THSW (P) to the exterior. Switching from the high-speed startup period T1 to the constant voltage control waiting period T2 is performed in response to the timing signal THSW (P). Units similarly configured for a positive bias for generating a high voltage having a positive polarity and a negative bias for generating a high voltage having a negative polarity are respectively assigned (P) and (N); the same shall apply hereinafter, and (P) and (N) are deleted from units that are common between both the positive and negative biases.

The outline of an operation of the high-voltage generation circuit in the high-voltage generation apparatus illustrated in FIG. 10 will be described below. An operation for generating a positive bias will be described. An operation for generating a negative bias is similar thereto except that the negative bias is opposite in polarity to the positive bias, and hence the description thereof is not repeated.

In FIG. 10, the maximum DUTY setting unit 41 previously generates a variable voltage Vduty, described below, in response to the various signals output from the ASIC 2, and supplies the generated variable voltage Vduty to the PWM generation circuit 45 at the time of startup and at a steady time. The PWM generation circuit 45 generates a PWM signal having an on-duty width corresponding to the supplied variable voltage Vduty, and the boosting transformer T1 is switching-driven in response to the PWM signal. The output voltage detection circuit 4 divides a high voltage output from the boosting transformer T1, to detect a divided voltage Vdt, and the comparator CMP10 performs comparison calculation between the detected divided voltage Vdt and a target voltage Vtgt (P) set in response to the high-voltage control signal HVCNT (P). The on-duty width of the PWM signal output by the PWM generation circuit 45 is feedback-controlled according to a comparison calculation result. The boosting transformer T1 is switching-driven with the on-duty width feedback-controlled. More specifically, the maximum DUTY setting circuit 41 variably sets the maximum on-duty width, and performs feedback control so that the output voltage becomes the target voltage in a range of the on-duty width. The microcontroller 1 can vary the maximum on-duty width. Therefore, a startup capability of the high-voltage generation apparatus is easily adjustable without changing hardware (e.g., specifications such as the number of windings of the boosting transformer T1).

Operations of the PWM generation circuit 45 for variably outputting the PWM signal and the comparator CMP10 will be first described. An output of the comparator CMP10 and a triangular wave signal having a pseudo triangular wave changed from the clock signal CLK via a resistor R6 and a capacitor C3 are input to the PWM generation circuit 45. The PWM generation circuit 45 includes a comparator CMP15, an FET Q3, resistors R2, R3, and R4, and a capacitor C2. The comparator CMP15 performs comparison calculation between the triangular wave signal input to a non-inverting input unit and a voltage of an inverting input unit, to variably output the on-duty width of the PWM signal. The lower the voltage of the inverting input unit is, the smaller the on-duty width on the low-level side of the PWM signal to be output is.

The comparator CMP10 performs comparison calculation between the detected divided voltage Vdt and the target voltage Vtgt (P), to generate a low-level output and turn off the FET Q3 if the detected voltage Vdt is the target voltage Vtgt (P) or less, and generate a high-level output and turn on the FET Q3 if the detected voltage Vdt is the target voltage Vtgt (P) or more. When the FET Q3 is turned on, the inverting input unit in the comparator CMP15 instantaneously falls to a potential of 0 V. Therefore, an output of the comparator CMP15 instantaneously enters a high level so that the high-voltage generation circuit is instantaneously turned off.

On the other hand, when the FET Q3 is turned off, an electric charge is charged in the capacitor C2 via the resistors R2 to R4 from the DC voltage Vduty generated by the maximum DUTY setting circuit 41, described below. A time constant for the charging is determined by the DC voltage Vduty and values of the resistors R2 to R4 and the capacitor C2. The on-duty width is moderately increased from zero using this time constant.

The maximum voltage of the capacitor C2 is obtained by dividing the voltage Vduty via the resistors R2 and R3, and the maximum on-duty width of the PWM signal output by the comparator CMP15 is set according to the maximum voltage of the capacitor C2. More specifically, the PWM generation circuit 45 generates a PWM signal having the maximum on-duty width that is varied according to the input voltage Vduty, and instantaneously reduces the on-duty width to zero, to instantaneously turn off the high-voltage generation circuit when the detected voltage Vdt exceeds the target voltage Vtgt (P). When the detected voltage Vdt falls below the target voltage Vtgt (P), a time constant is given to startup, to slowly start the high-voltage generation circuit. As a result, a voltage vibration (a ripple or a hunting) generated by feedback control for maintaining a constant voltage is significantly reduced.

Peripheral circuits including the boosting transformer T1 formed in the high-voltage generation circuit will be described below. The PWM signal output from the PWM generation circuit 45 is input to a gate terminal of an FET Q4. The FET Q4, a power source voltage Vcc, and a resistor R8 drive a gate terminal of a power MOSFET Q5 in response to the PWM signal input to the gate terminal of the FET Q4. The power MOSFET Q5 switching-drives the boosting transformer T1. The boosting transformer T1, which has been switching-driven, outputs a high pulsating voltage. The high pulsating voltage output by the boosting transformer T1 is rectified by a rectifier including a high-voltage diode D2, a high-voltage capacitor C5, a resistor R9, and the output voltage detection circuit 4 and is changed into a DC voltage, and is output to a load unit HVoutput. The output voltage detection circuit 4 divides the high voltage output to the load unit HVoutput, to detect a divided voltage Vdt. The comparator CMP10 monitors the detected divided voltage Vdt, and compares the divided voltage Vdt with the target voltage Vtgt (P) set in response to the high-voltage control signal HVCNT (P), to perform feedback control for maintaining the target voltage.

While the PWM generation circuit 45 outputs the PWM signal having the maximum on-duty width during waiting for startup, it is forcedly turned off by an FET Q2 arranged downstream thereof. If the FET Q2 is turned off, therefore, switching can be instantaneously started in response to the PWM signal having the maximum on-duty width. The FET Q2 directly controls the gate terminal of the power MOSFET Q5 in response to the ON/OFF control signal /HVON so that a response delay time can be reduced when the high-voltage generation circuit is turned on and off. If the response delay time may be slightly longer, the high-voltage generation circuit may be turned on and off by fixing the clock signal CLK output from the ASIC 2 to a high-level state in place of the ON/OFF control signal /HVON (P) and the FET Q2.

The maximum DUTY setting circuit 41 will be described below. The maximum DUTY setting circuit 41 includes a differential amplifier circuit 43 and an operation amplifier OP41. The positive-bias high-voltage control signal HVCNT (P) and the negative-bias high-voltage control signal HVCNT (N) are connected to the differential amplifier circuit 43, and a correction value obtained by adding a value of the negative-bias high-voltage control signal HVCNT (N) as a correction amount to a value of the positive-bias high-voltage control signal HVCNT (P). The timing signal THSW (P) for variably switching a slew rate is connected to the differential amplifier circuit 43. An output value of the differential amplifier circuit 43 is switched to a predetermined fixed value and output in response to the timing signal THSW (P). The timing signal THSW (P) is delayed from the ON/OFF control signal /HVON with a timer time width set by the timer 5. Switching from the high-speed startup period T1 to the constant voltage control waiting period T2 is performed with the time width set by the timer 5.

The operational amplifier OP41 buffers the correction value output from the differential amplifier circuit 43, and outputs the voltage Vduty. The maximum on-duty width of the PWM signal generated by the PWM generation circuit 45 is varied according to the voltage Vduty.

Figure 11:
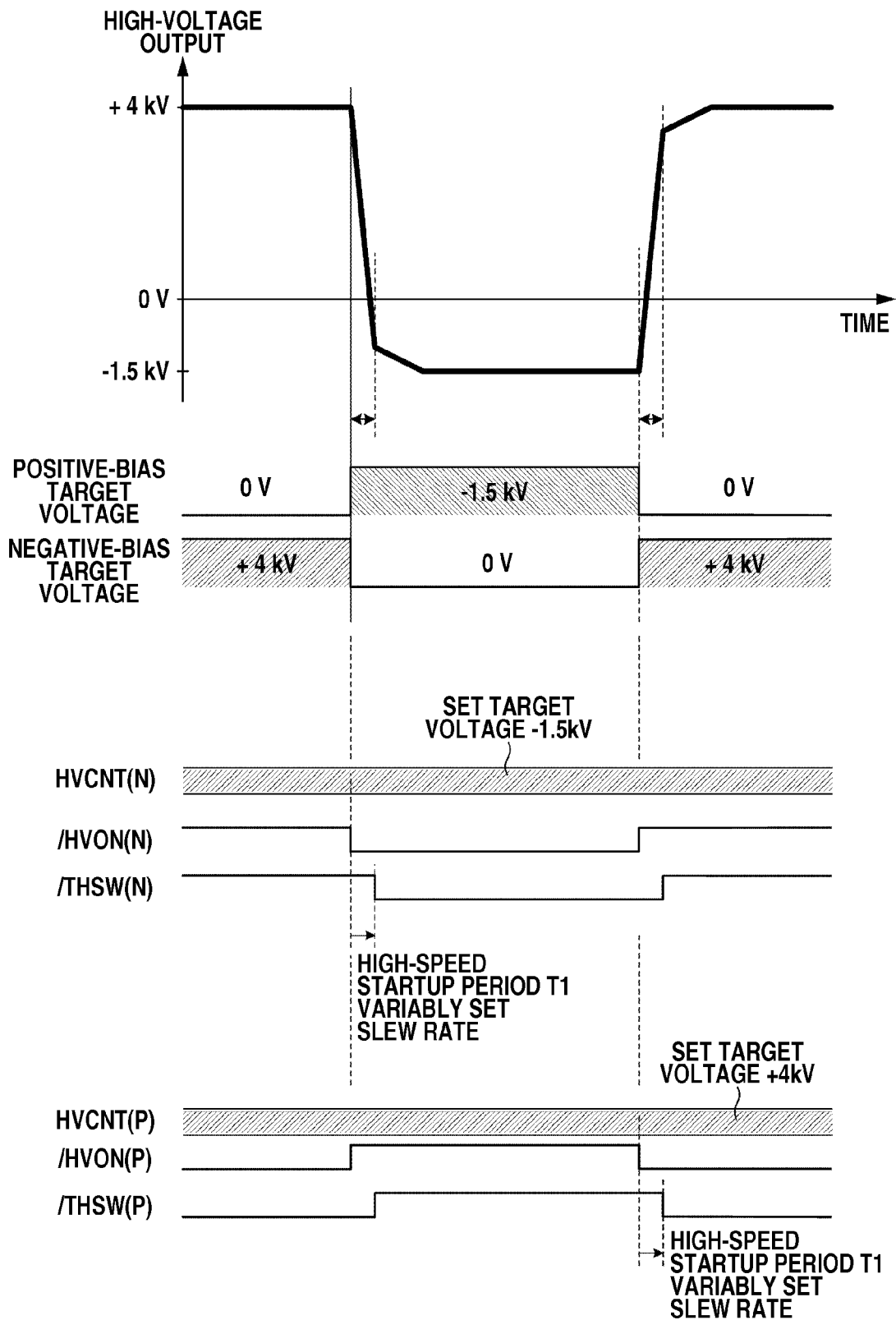
FIG. 11 illustrates timing between a high-voltage output waveform according to the second exemplary embodiment of the present inventions relative to each signal.

Setting of output target voltages for a positive bias and a negative bias and timing between each signal and an output voltage will be described below with reference to FIG. 11. FIG. 11 illustrates timing between each signal and a voltage waveform having both positive and negative polarities output from the high-voltage generation apparatus according to the present exemplary embodiment. As an example, the output voltage is switched from a positive-bias output of +4 kV to a negative-bias output of −1.5 kV, and is then switched to a positive bias output of +4 kV again. The microcontroller 1 previously sets a target voltage having each of the polarities in the HVtgt unit (160, 162) serving as the target voltage setting register. While the ASIC 2 always outputs an analog signal corresponding to the HVtgt unit (160, 162), the high-voltage generation circuit waits for startup in a forcedly off state when the FET (Q2, Q52) is turned on. The ON/OFF setting unit (161, 163) serving as the ON/OFF setting register is actively turned on so that the ON/OFF control signal /HVON is output, the FET (Q2, Q52) is turned off, and the startup of the high-voltage generation circuit having each of the polarities is started. Then, a slew rate is switched in response to the timing signal /THSW delayed according to the time width set by the timer 5 so that the switching from the high-speed startup period T1 to the constant voltage control waiting period T2 is performed.

Figure 12A:
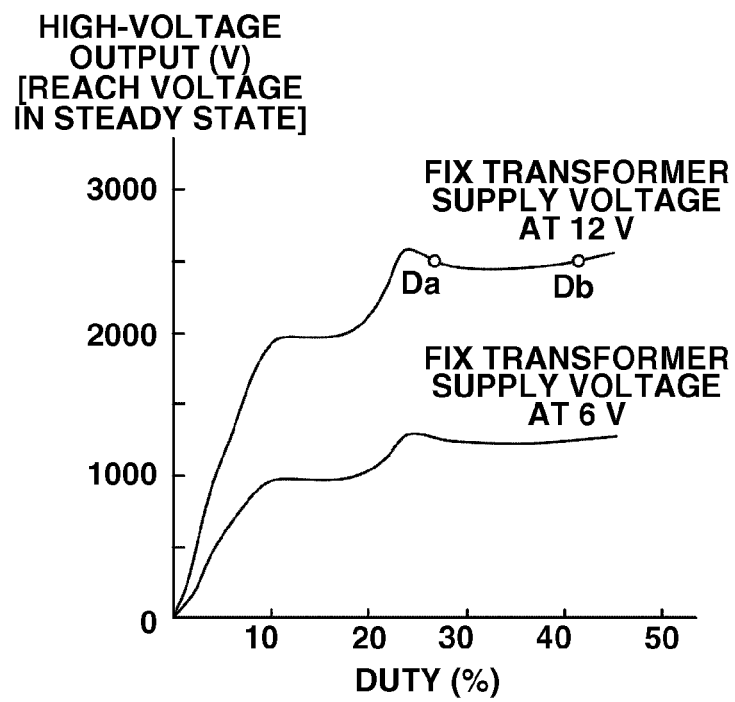
FIGS. 12A and 12B illustrate high-voltage waveforms at the time of startup according to the second exemplary embodiment of the present invention.

A relationship between a slew rate in a startup transient state variably set in the present exemplary embodiment and an on-duty width will be described below with reference to FIGS. 12A and 12B and FIG. 13. FIG. 12A illustrates a relationship between an on-duty width of a PWM signal with which the high-voltage generation circuit is to be switching-driven and an output voltage (a reach voltage in a steady state without feedback control) as characteristic curves measured using a boosting circuit for steeply raising a voltage output from an output unit. A transformer supply voltage and an output voltage have a proportional relationship. Therefore, the characteristic curves indicate that an output voltage generated when an input voltage is 6V is half an output voltage generated when it is 12 V. However, the on-duty width of the PWM signal with which switching-driving is to be performed and the output voltage do not have a proportional relationship but a greatly distorted relationship.

In the characteristic curve obtained when the input voltage is 12 V, respective output voltages (reach voltages in a steady area without feedback control) at a point Da having an on-duty width in the vicinity of 27% and a point Db having an on-duty width in the vicinity of 43% are approximately 2500 V even if duty widths, with which switching-driving is to be performed, differ from each other. However, respective slew rates at the time of startup at the points greatly differ from each other, as illustrated in FIG. 12B. Even if both reach voltages at which the output voltages at the points are saturated without feedback control are 2500 V, the output voltage at the point Db having the larger on-duty width rises faster. FIG. 13 illustrates a relationship between the on-duty width and a high-voltage output value after a lapse of a predetermined time (corresponding to an output rise curve or a slew rate in the transient state) in a transient state as measured characteristic curves. The output voltage in the transient state attained after a lapse of the same time is substantially proportional to the on-duty width.

The high-voltage generation apparatus according to the present exemplary embodiment uses the property that an on-duty width and an output voltage in a transient state are proportional to each other, to variably set a slew rate in the transient state. The maximum on-duty width at the start of startup is previously variably set to a value corresponding to a target voltage, to start the high-voltage generation circuit. More specifically, a load voltage is raised while the slew rate is variably set according to the target voltage. For example, when the target voltage is low, the slew rate is variably set to decrease so that an overshoot is reduced. On the other hand, when the target voltage is high, the slew rate is variably set to increase so that a startup period is shortened. In the case, the output voltage is linearly raised with such an on-duty width that it reaches the target voltage in a curved state where hardware is steeply started up (a state where a time constant has not reached a gently inclined curve). When the hardware then detects that the output voltage has reached the target voltage, the on-duty width is instantaneously reduced to zero, to rapidly turn off the high-voltage generation circuit.

As a result, even a high-voltage generation circuit, in which a slew rate is high when an output voltage is raised, and an output voltage (a reach voltage in a steady area without feedback control) does not have a proportional relationship with an on-duty width, does not perform target control dependent on a relationship between the on-duty width and the output voltage (the reach voltage in the steady area without feedback control) in control of the on-duty width in the high-voltage generation apparatus according to the present exemplary embodiment. Therefore, control can be performed without any problems in accuracy and stability.

Figure 15A:
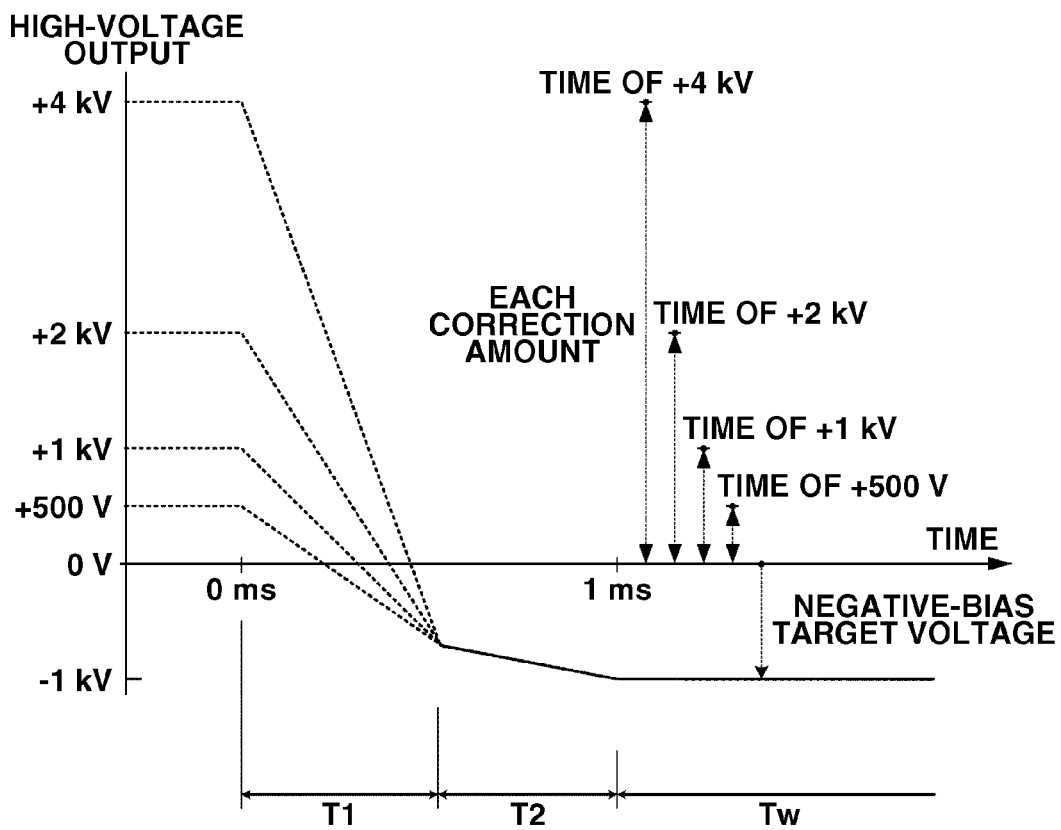
FIGS. 15A and 15B illustrate a relationship between an on-duty width of a PWM signal and a high-voltage output (in a transient state) after a lapse of a predetermined time.
Figure 15B:
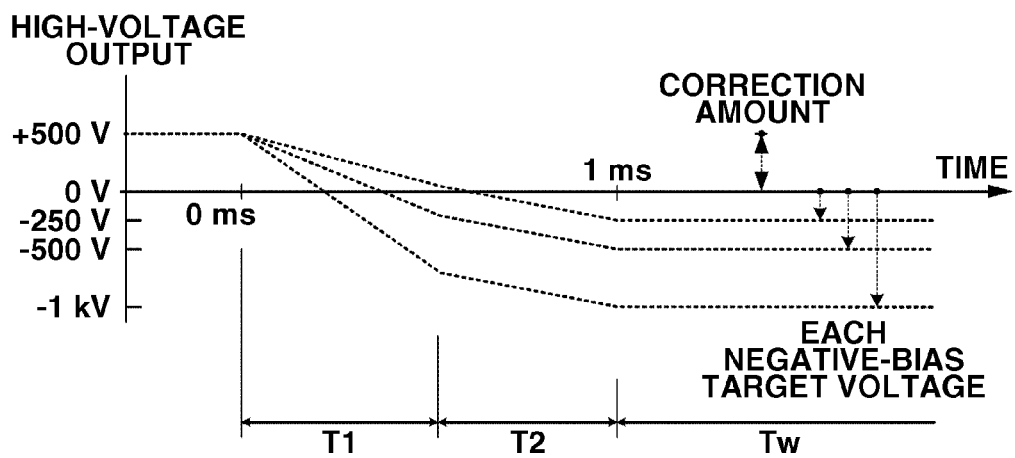

FIG. 14 and FIGS. 15A and 15B illustrate specific examples of high-voltage waveforms generated by the analog circuit and the ASIC 7 in the high-voltage generation apparatus that outputs both positive-polarity and negative-polarity biases, described above. A waveform at the time of startup of the high-voltage generation apparatus described in the present exemplary embodiment is basically similar to the waveform βc illustrated in FIG. 7C in the first exemplary embodiment. As a specific example of the high-voltage waveform illustrated in FIG. 14, a slew rate in the high-speed startup period T1 is variably set, to start the high-voltage generation apparatus, while a load unit is charged with an a potential having an opposite polarity, according to the magnitude of the potential having the opposite polarity. FIG. 14 illustrates examples of waveforms, in which a negative-polarity bias is raised to target voltages (−250 V, −500 V, and −1 kV) from a state where the load unit is charged with potentials (+500 V, +1 kV, +2 kV, and +4 kV). A slew rate slowly switched before an output voltage reaches a target voltage is common among the waveforms. FIGS. 15A and 15B illustrate some waveforms extracted using the same parameter from FIGS. 12A and 12B.

Figure 12B:
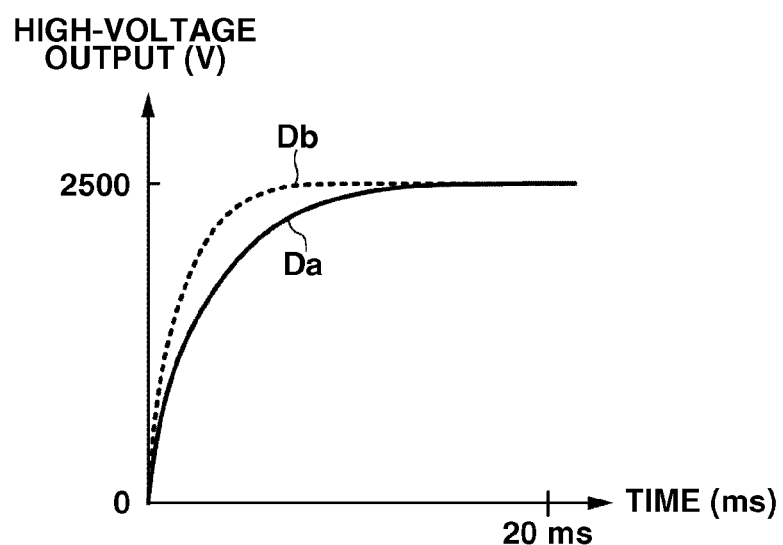

FIG. 15A illustrates waveforms, in which a negative-polarity bias is raised to a target voltage −1 kV from a state where the load unit is charged with potentials (+500 V, +1 kV, +2 kV, and +4 kV), extracted from FIGS. 12A and 12B. Each of the waveforms includes the high-speed startup period T1, the constant voltage control waiting period T2 elapsed before the negative-polarity bias reaches the target voltage having a polarity, and a feedback control period Tw during which the negative-polarity bias is held at a constant voltage. The magnitude of a load potential charged to an opposite polarity becomes a correction amount. The high-voltage generation apparatus is started up while a slew rate in the high-speed startup period T1 is variably set according to a correction value obtained by adding the correction amount to the magnitude of the target voltage of the negative-polarity bias. In all the waveforms, the negative-polarity bias reaches the same voltage after a lapse of the high-speed startup period T1 and reaches the target voltage of −1 kV in a total of 1 ms.

FIG. 15B illustrates waveforms, in which a negative-polarity bias is raised to target voltages (−250 V, −500 kV, and −1 kV) from a state where the load unit is charged with a potential of +500 V, extracted from FIGS. 12A and 12B. Each of the waveforms includes periods T1, T2, and Tw, which are similar to those illustrated in FIG. 13A. The high-voltage generation apparatus is started up while a slew rate in the high-speed startup period T1 is variably set according to a correction value considering the magnitude of a load potential charged to a polarity opposite to that of the target voltage. A voltage that reaches the target voltage after a lapse of the high-speed startup period T1 is varied according to the correction value, unlike that illustrated in FIG. 15A. In all the waveforms, the negative-polarity bias reaches the target voltage of −1 kV in a total of 1 ms.

FIG. 17B illustrates a relationship between the slew rate previously variably set in the high-speed startup period T1 and the correction value considering the magnitude of the load potential charged to the opposite polarity, described with reference to FIG. 14 and FIGS. 15A and 15B. The slew rate is set proportional to a correction value corresponding to the magnitude of the target voltage having a polarity with the added magnitude of the potential having an opposite polarity at the load unit. The slew rate in the high-speed startup period T1 is previously variably set in the relationship illustrated in FIG. 17B so that a rise in the output voltage in the high-voltage generation apparatus can be increased in speed as the waveforms illustrated in FIG. 14.

As described above, according to the present exemplary embodiment, the on-duty width of the PWM signal is variably set so that the high-voltage generation apparatus is started up at a high slew rate according to the correction value corresponding to the magnitude of the output voltage having a polarity with the added magnitude of the potential having an opposite polarity at the load unit. Even if the load unit has the opposite polarity, and the potential having the opposite polarity takes various large and small values, therefore, the high-voltage generation circuit can be started up while the slew rate at the time of startup is varied with a high resolution according to the correction value. As a result, the output voltage can reach the target voltage in a rapidly shortened time independently of the magnitude of the potential having the opposite polarity at the load unit.

A third exemplary embodiment of the present invention will be described below. A high-voltage generation apparatus according to the third exemplary embodiment estimates, from a target voltage having a polarity of a positive-polarity bias output immediately before a negative-polarity bias is started, a potential having an opposite polarity (a positive polarity) charged into a load unit. In the present exemplary embodiment, a voltage detection circuit 4 configured to enable detection of output voltages having both positive and negative polarities detects a load potential having an opposite polarity before the high-voltage generation apparatus is started up. A slew rate in a startup transient state is variably set according to a correction value corresponding to the magnitude of the target voltage having a polarity with the added magnitude of the detected potential having an opposite polarity at the load unit.

Figure 18D:
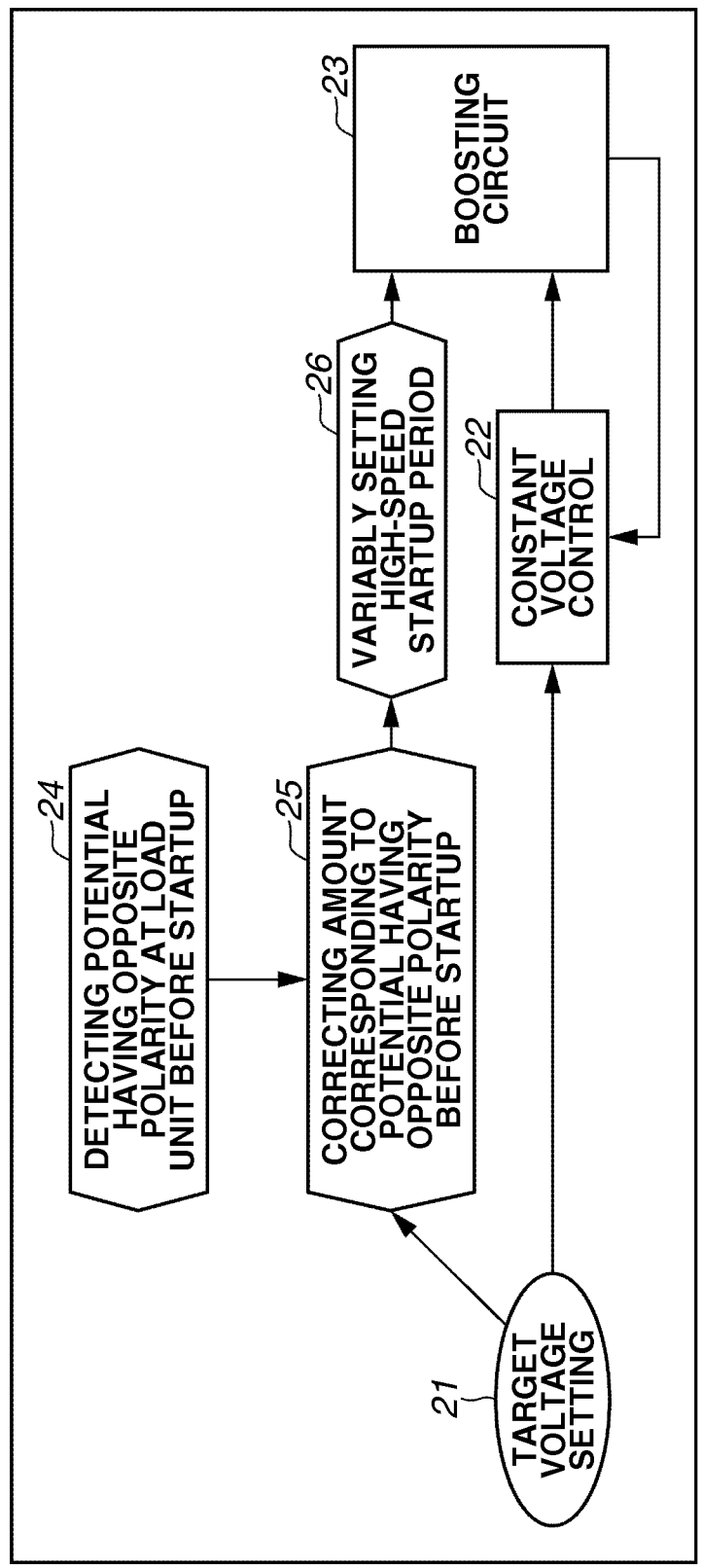

A high-voltage generation apparatus capable of detecting output voltages having both positive and negative polarities is applicable to an electrophotographic image forming apparatus in which there occurs a situation where a load unit is charged with a load potential having an opposite polarity due to another factor, even though a high-voltage generation circuit having the opposite polarity is not formed. The high-voltage generation apparatus according to the present exemplary embodiment is a high-voltage generation apparatus having a single polarity applied under such a situation. FIG. 18D is a block diagram schematically illustrating functions. The high-voltage generation apparatus illustrated in FIG. 18D further includes a block 24 for previously detecting a load potential charged to an opposite polarity in addition to the conventional high-voltage generation apparatus illustrated in FIG. 18A.

Figure 16:
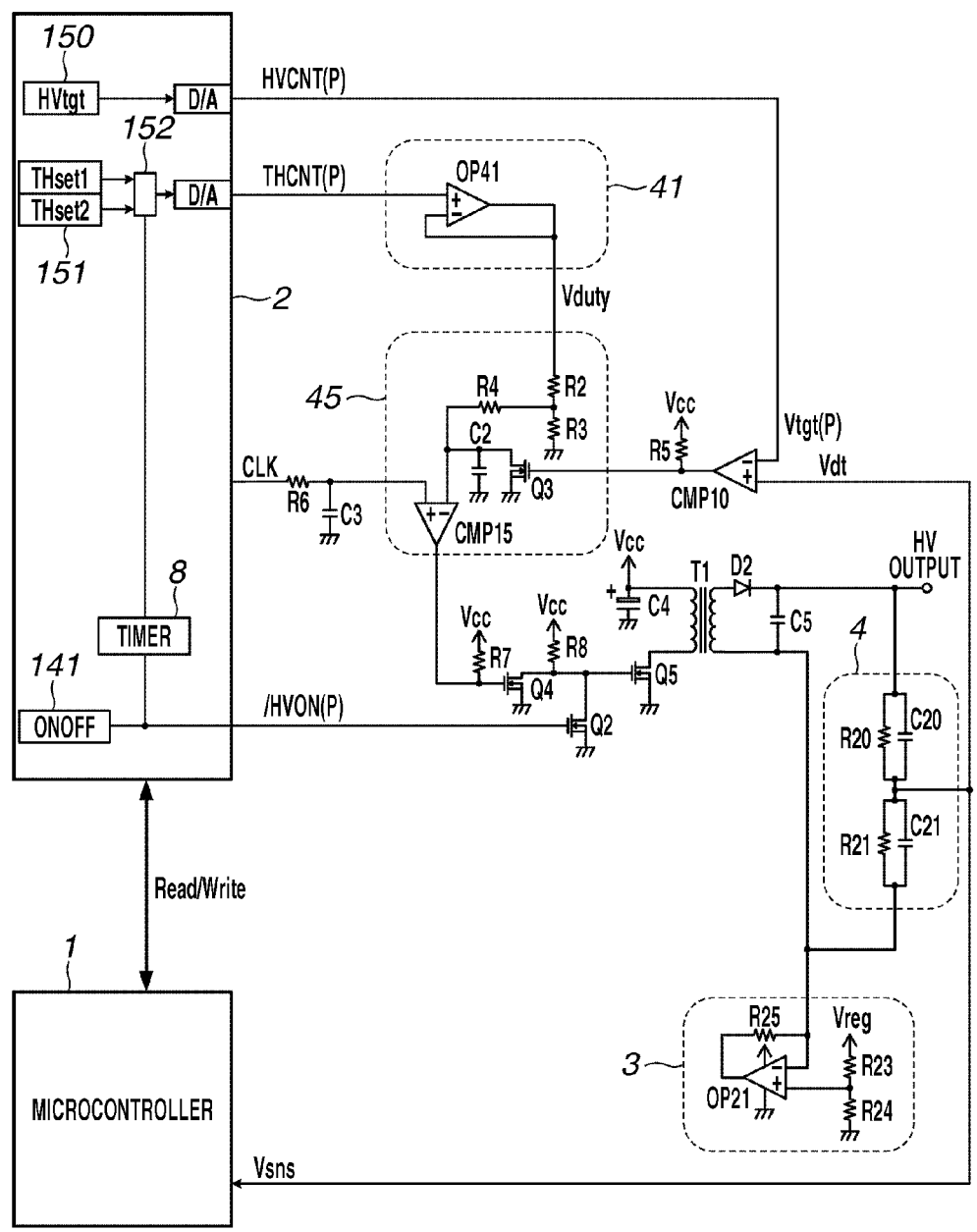
FIG. 16 illustrates a circuit configuration of a high-voltage generation apparatus according to a third exemplary embodiment of the present invention.

FIG. 16 illustrates a configuration of the high-voltage generation apparatus. Similar constituent elements and signals to those previously described in the first and second exemplary embodiments are assigned the same reference numerals and symbols, and hence the description thereof is not repeated. An offset potential setting circuit 3 enables detection of an output voltage regardless of positive and negative polarities by holding a voltage at one end of the output detection circuit 4 at not a GND potential but a predetermined potential Vofset. A microcontroller 1 monitors a load voltage Vsns detected by the output voltage detection circuit 4. The microcontroller 1 writes a varied value into a THset1 unit 151 serving as a slew rate setting register in a high-speed startup period T1 according to the detected load voltage Vsns monitored before startup. A fixed value of a slew rate used in a constant voltage control waiting period T2 is previously set in a THset2 unit 151 serving as a slew rate setting register. An ASIC 2 first outputs a slew rate variable signal THCNT corresponding to a register value in the THset1 unit 151 when an ON/OFF setting unit 141 starts the high-voltage generation circuit, and then outputs a slew rate variable signal THCNT corresponding to a register value in the THset2 unit 151 after a lapse of a time set in a timer 8. A switch 152 switches the slew rate.

As a result, even if a load unit is charged with a potential having an opposite polarity, and the potential having the opposite polarity takes various large and small values, the high-voltage generation circuit can be started up at a slew rate variably set according to a correction value corresponding to the magnitude of the target voltage having a polarity with the added magnitude of the potential having an opposite polarity at the load unit. As a result, the output voltage can reach the target voltage in a rapidly shortened time independently of the magnitude of the potential having the opposite polarity at the load unit.

The high-voltage generation apparatuses according to the first to third exemplary embodiments, described above, can be applied to the above-mentioned electrophotographic image forming apparatus. An example of an application of the high-voltage generation apparatus will be described by taking a laser beam printer as an example of the electrophotographic image forming apparatus.

Figure 19A:
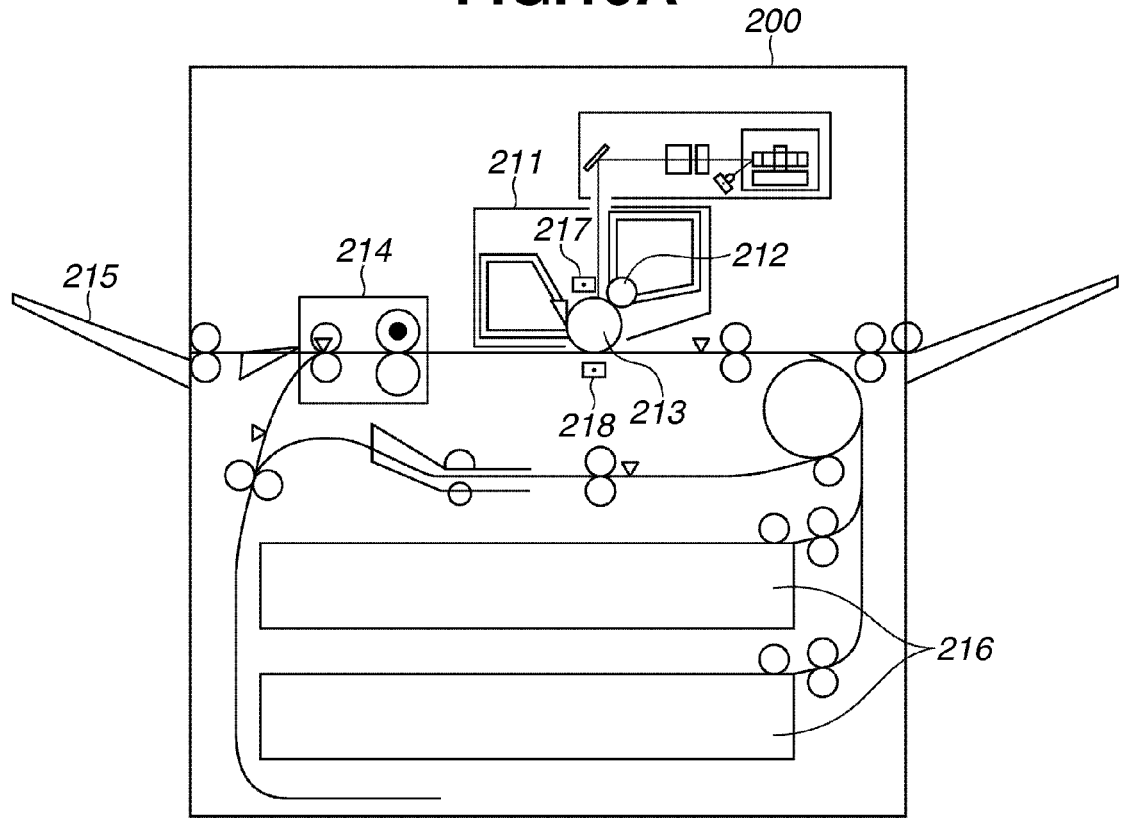
FIGS. 19A and 19B illustrate examples of an application of a high-voltage generation apparatus.

The high-voltage generation apparatus described in the above-mentioned exemplary embodiment is applicable as a high-voltage power source for applying a high voltage to an image forming unit in an electrophotographic printer. FIG. 19A illustrates a schematic configuration of a laser beam printer as an example of the electrophotographic printer. A laser beam printer 200 includes a photosensitive drum 211 serving as an image bearing member on which a latent image is formed, a charging unit 217 for uniformly charging the photosensitive drum 211, and a development unit 212 for developing the latent image formed on the photosensitive drum 211 with toner. A transfer unit 218 transfers a toner image developed on the photosensitive drum 211 onto a sheet (not illustrated) serving as a recording material supplied from a cassette 216, and a fixing device 214 fixes the toner image that has been transferred on the sheet, and discharges the sheet to a tray 215. The photosensitive drum 211, the charging unit 217, the development unit 212, and the transfer unit 218 constitute an image forming unit.

Figure 19B:
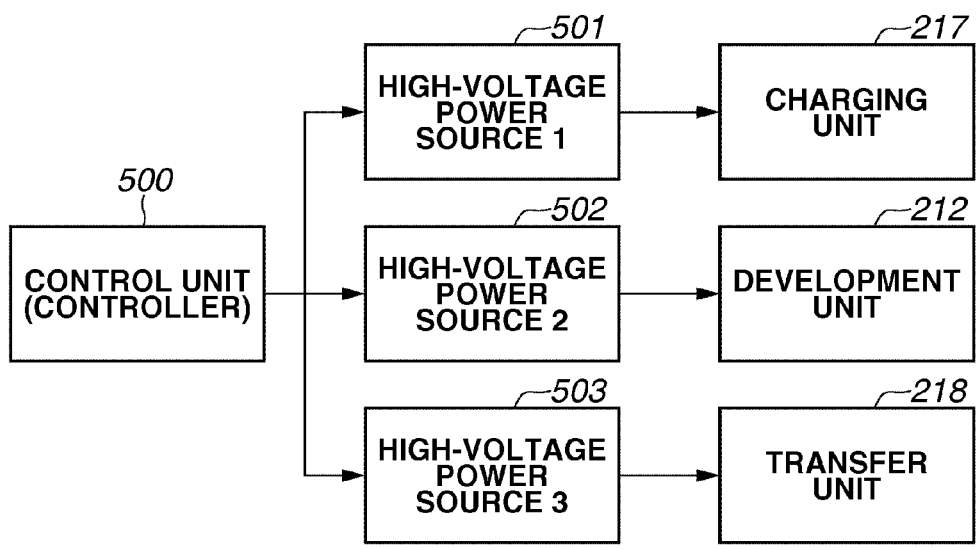

FIG. 19B illustrates a configuration in which high voltages output from a plurality of high-voltage power sources 501 to 503 (the high-voltage generation apparatuses described in the first to third exemplary embodiments) provided in the laser beam printer 200 are respectively output to the charging unit 217, the development unit 212, and the transfer unit 218. The first high-voltage power source 501 outputs the high voltage to the charging unit 217, the second high-voltage power source 502 outputs the high voltage to the development unit 212, and the third high-voltage power source 503 outputs the high voltage to the transfer unit 218. The high voltages output from the high-voltage power sources 501 to 503 are respectively controlled to be voltages required in response to a control signal output from a controller 500 serving as a control unit. When the high voltage is output to the charging unit 217, for example, the above-mentioned current detection circuit detects a current flowing through the charging unit 217, to adjust the output so that the detected current has a predetermined value. When the high voltage is output to the transfer unit 218, the current detection circuit detects a current flowing through the transfer unit 218, to adjust the output so that the detected current has a predetermined value. When the high voltage is output to the development unit 212, the above-mentioned voltage detection circuit detects a voltage, to adjust the output so that the detected voltage has a predetermined value. Thus, the high-voltage power source is applicable to apply a high voltage for image formation. More specifically, when patch images for respectively detecting a color misregistration and a density, described above, are formed between the recording materials (also referred to as between sheets), a high voltage can be switched into a positive polarity and a negative polarity at high speed. Even if an image is formed in an area where there is no recording material, control can be performed so that the image is not transferred onto a transfer roller.

As described above, if the high-voltage power sources described in the first to fourth exemplary embodiments are applied as high-voltage power sources for an electrophotographic printer, the speed of the image forming apparatus can be increased, and a first print out time (FPOT) can be shortened.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-172929 filed Jul. 30, 2010, which is hereby incorporated by reference herein in its entirety.

What is claimed is:

1. A high-voltage generation apparatus that outputs a first direct-current voltage having a predetermined polarity or a second direct-current voltage having a polarity opposite to the predetermined polarity, comprising:
an output unit configured to output the first direct-current voltage or the second direct-current voltage;
a setting unit configured to set a first target voltage corresponding to the first direct-current voltage or a second target voltage corresponding to the second direct-current voltage;
a control unit configured to set a first time period for which voltage is changed in a first change amount and set, after setting the first time period, a second time period for which voltage is changed in a second change amount smaller than the first change amount, in a switching time period for which the first target voltage switches to the second target voltage, in a case of switching from a state where the first target voltage is output from the output unit to a state where the second target voltage is output from the output unit,
wherein the control unit changes the first time period and the second time period in accordance with a difference value between the first target voltage and the second target voltage.

2. The high-voltage generation apparatus according to claim 1, wherein the control unit changes the first time period of a case in which the difference value is a first value to be longer than the first time period of a case in which the difference value is a second value smaller than the first value, and changes the second time period of a case in which the difference value is the first value to be shorter than the second time period of a case in which the difference value is the second value smaller than the first value.

3. The high-voltage generation apparatus according to claim 1, further comprising a detection unit configured to detect the first direct-current output voltage or the second direct-current voltage,
wherein the control unit controls the output unit so that the first voltage detected by the detection unit to be the first target voltage value after the first voltage reached the first target voltage value or the second voltage detected by the detection unit to be the second target value after the second voltage reached the second target voltage value.

4. An image forming apparatus comprising:
an image forming unit configured to form an image on a recording material; and
a high-voltage generation apparatus that outputs a first direct-current voltage having a predetermined polarity or a second direct-current voltage having a polarity opposite to the predetermined polarity to the image forming unit,
wherein the high-voltage power source includes
an output unit configured to output the first direct-current voltage or the second direct-current voltage,
a setting unit configured to set a first target voltage corresponding to the first direct-current voltage or a second target voltage corresponding to the second direct-current voltage,
a control unit configured to set a first time period for which voltage is changed in a first change amount and set, after setting the first time period, a second time period for which voltage is changed in a second change amount smaller than the first change amount, in a switching time period for which the first target voltage switches to the second target voltage, in a case of switching from a state where the first target voltage is output from the output unit to a state where the second target voltage is output from the output unit,
wherein the control unit changes the first time period and the second time period in accordance with a difference value between the first target voltage and the second target voltage.

5. The image forming apparatus according to claim 4, wherein the image forming unit includes an image bearing member, and a transfer unit configured to transfer a toner image formed on the image bearing member to a recording material,
wherein the first direct-current voltage is applied to the transfer unit when transferring the toner image formed on the image bearing member onto the recording material, and the second direct-current voltage is applied to the transfer unit in a non-image formation area on the image bearing member, and
wherein a patch toner image for adjusting the image forming apparatus is formed in the non-image formation area.

6. The image forming apparatus according to claim 5, wherein the non-image formation area corresponds to distances among a plurality of toner images transferred onto a plurality of recording materials.

7. The image forming apparatus according to claim 4, wherein the control unit changes the first time period of a case in which the difference value is a first value to be longer than the first time period of a case in which the difference value is a second value smaller than the first value, and changes the second time period of a case in which the difference value is the first value to be shorter than the second time period of a case in which the difference value is the second value smaller than the first value.

8. The image forming apparatus according to claim 4, further comprising a detection unit configured to detect the first direct-current output voltage or the second direct-current voltage,
wherein the control unit controls the output unit so that the first voltage detected by the detection unit to be the first target voltage value after the first voltage reached the first target voltage value or the second voltage detected by the detection unit to be the second target value after the second voltage reached the second target voltage value.

* * * * *